(12) United States Patent
Biondi

(10) Patent No.: US 6,508,330 B1
(45) Date of Patent: Jan. 21, 2003

(54) ROTATING OLEODYNAMIC DISTRIBUTION SYSTEM FOR THE STEERING OF REAR AXLES OF VEHICLES

(76) Inventor: Armando Biondi, Via della Pace, 24, I-40010 Sala Bolognese (IT)

( * ) Notice: Subject to any disclaimer, the term of this patent is extended or adjusted under 35 U.S.C. 154(b) by 0 days.

(21) Appl. No.: 09/744,855

(22) PCT Filed: Jul. 30, 1999

(86) PCT No.: PCT/IT99/00253
§ 371 (c)(1),
(2), (4) Date: Jan. 30, 2001

(87) PCT Pub. No.: WO00/07866
PCT Pub. Date: Feb. 17, 2000

(30) Foreign Application Priority Data

Aug. 7, 1998 (IT) .......................... VR98A0072

(51) Int. Cl.⁷ ................................. B62D 5/06
(52) U.S. Cl. .................. 180/441; 180/408; 180/417; 180/24.01; 137/625.23
(58) Field of Search .................. 180/408, 414, 180/23, 24, 24.01, 441, 442, 443, 426, 417; 280/426, 442, 443; 137/625.22, 625.23, 625.24

(56) References Cited

U.S. PATENT DOCUMENTS

| 4,705,129 A | | 11/1987 | Fassbender |
| 4,936,402 A | * | 6/1990 | White, Jr. .................... 180/441 |
| 5,577,573 A | * | 11/1996 | Haga et al. .................. 180/417 |
| 5,839,527 A | * | 11/1998 | Elser et al. ............... 180/24.01 |

FOREIGN PATENT DOCUMENTS

| DE | 26 55 379 A1 | 6/1978 |
| DE | 38 37 981 A1 | 5/1990 |
| DE | 42 10 001 A1 | 9/1993 |
| EP | 0 134 036 A2 | 3/1985 |
| EP | 0 710 601 A1 | 5/1996 |
| EP | 0 786 394 A1 | 7/1997 |
| EP | 0 845 403 A2 | 6/1998 |
| GB | 2 306 927 A | 5/1997 |

* cited by examiner

*Primary Examiner*—Kevin Hurley
(74) *Attorney, Agent, or Firm*—Greenberg Traurig, LLP

(57) ABSTRACT

A hydraulic power steering system for steering rear axles of vehicles comprises a distribution system (10) coupled to a wheel of the rear axle. The distribution system (10) has a core (12) encased in a casing (11) and rotatable to distribute pressurised fluid to a cylinder (40). The distribution system comprises resilient centring means in form of a sphere (22) and spring (23).

25 Claims, 23 Drawing Sheets

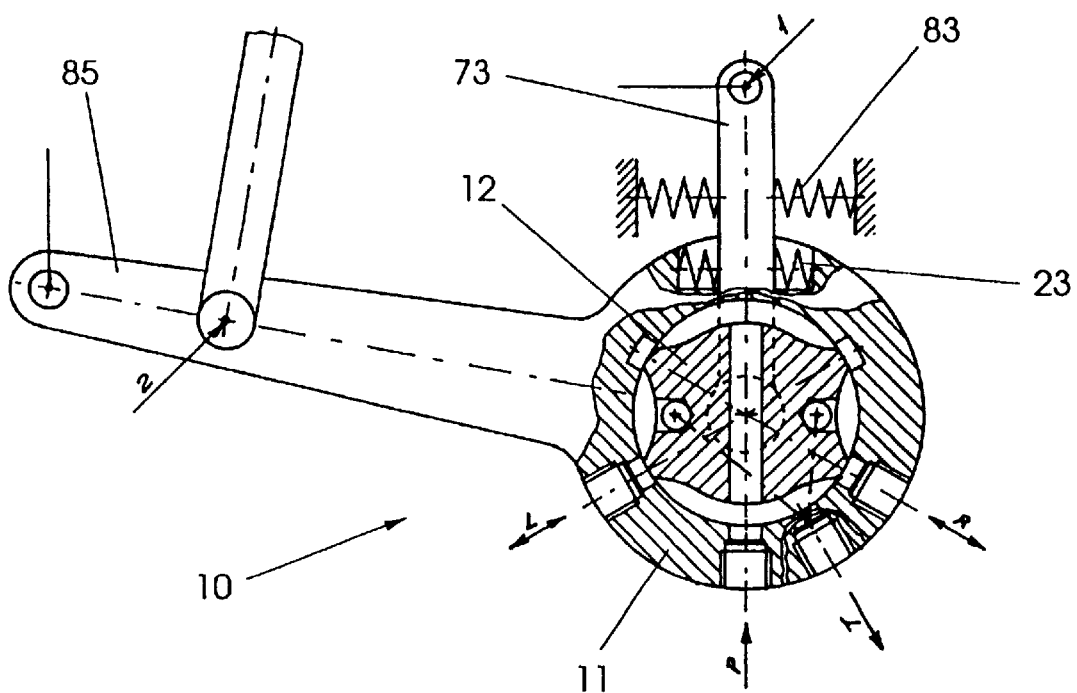
Fig. 10
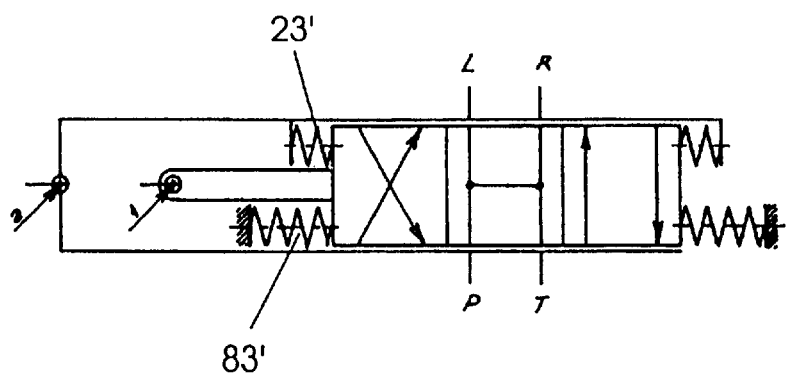

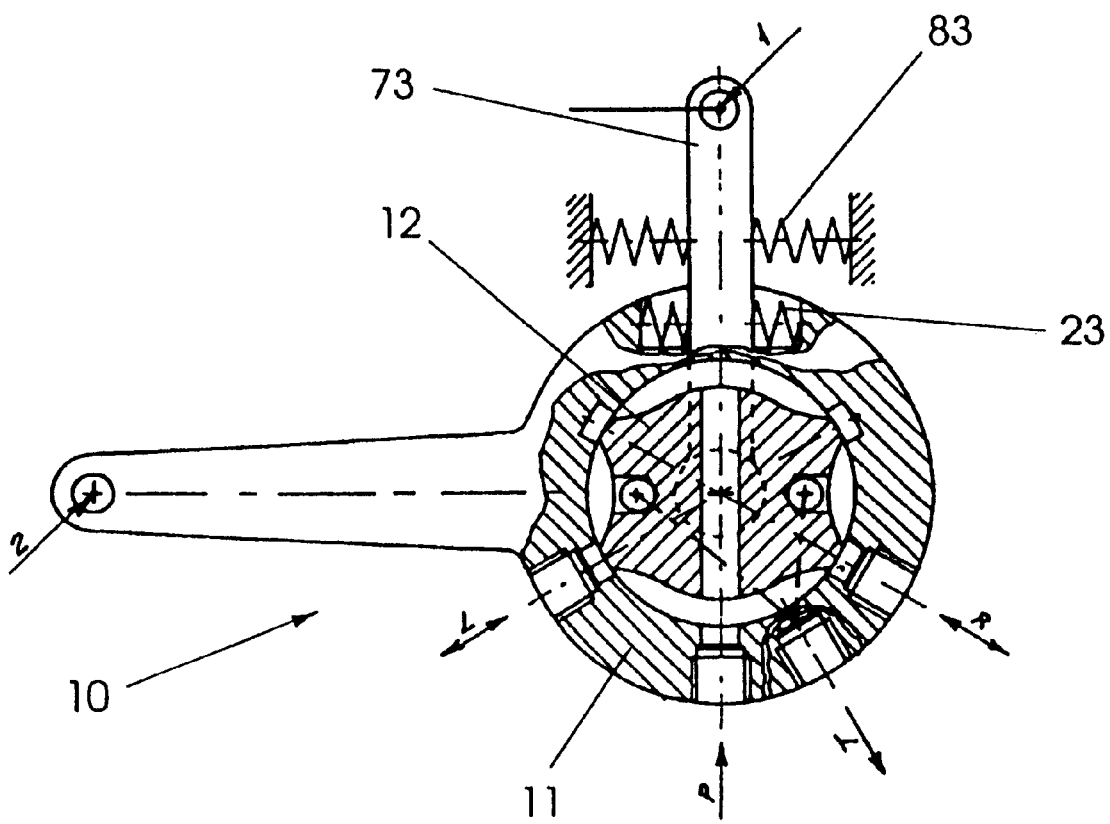
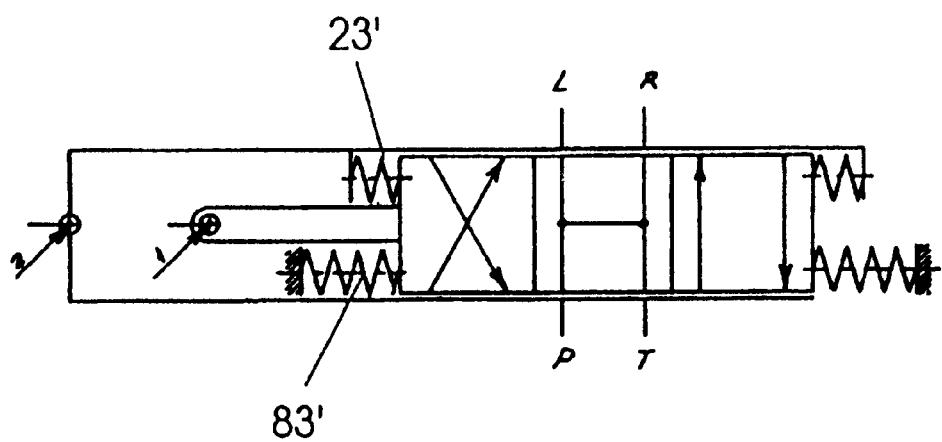
Fig. 11

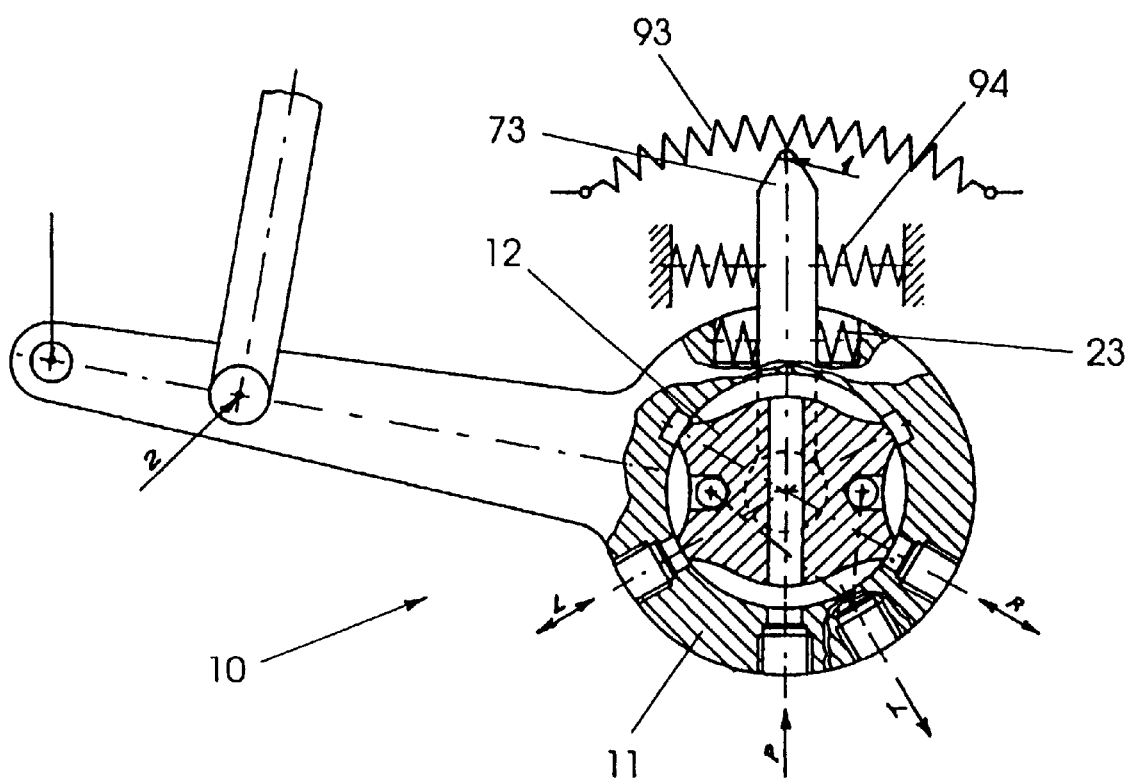
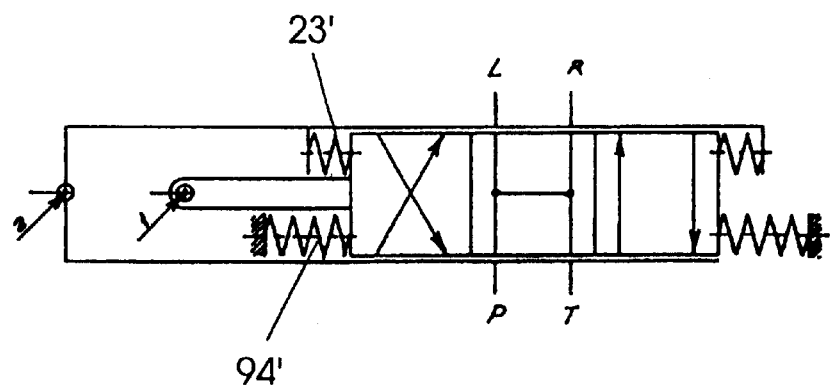
Fig. 12

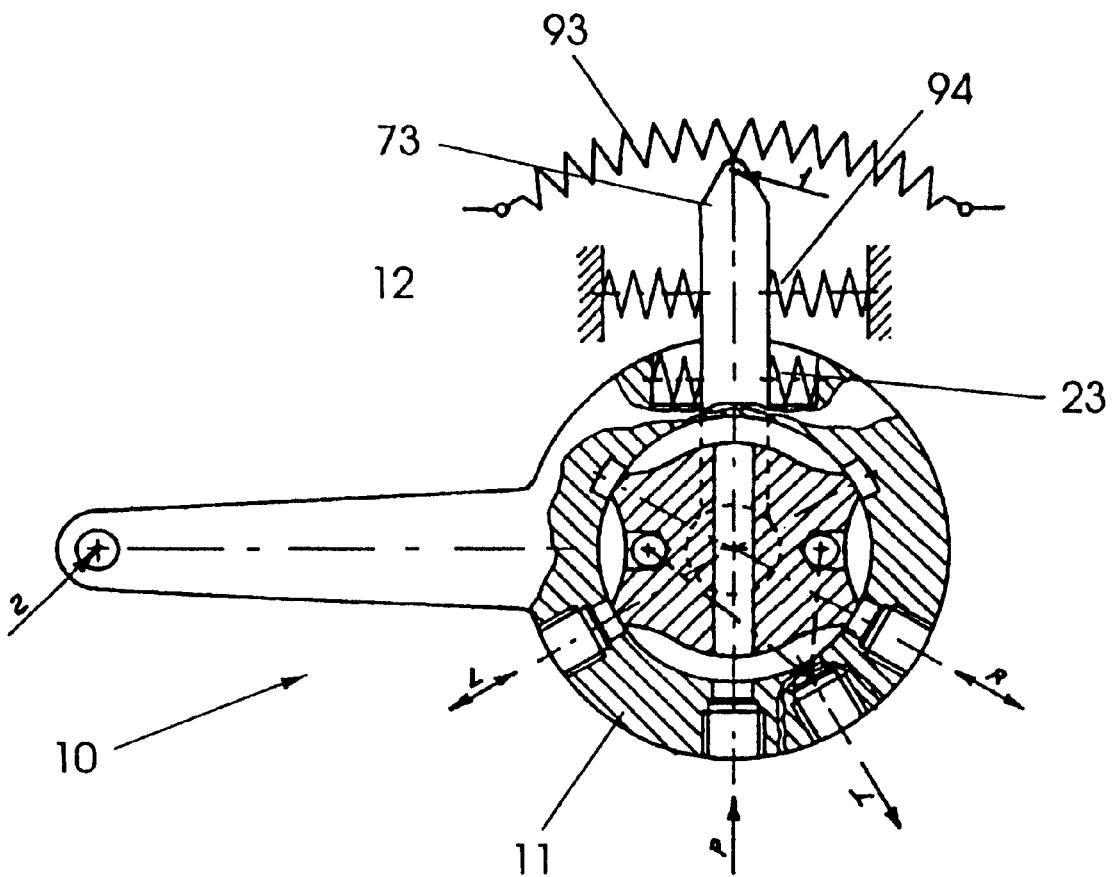
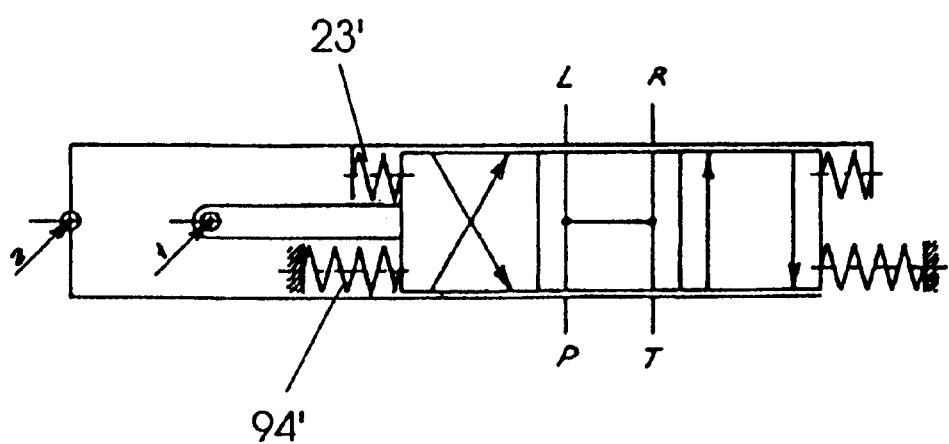
Fig. 13

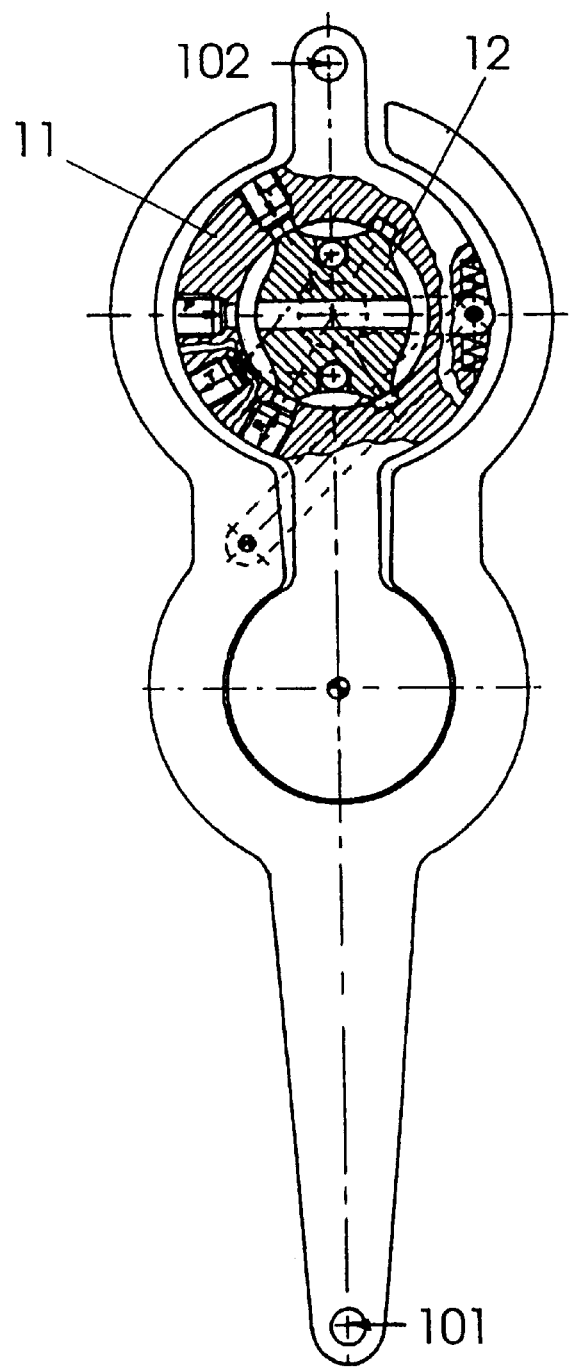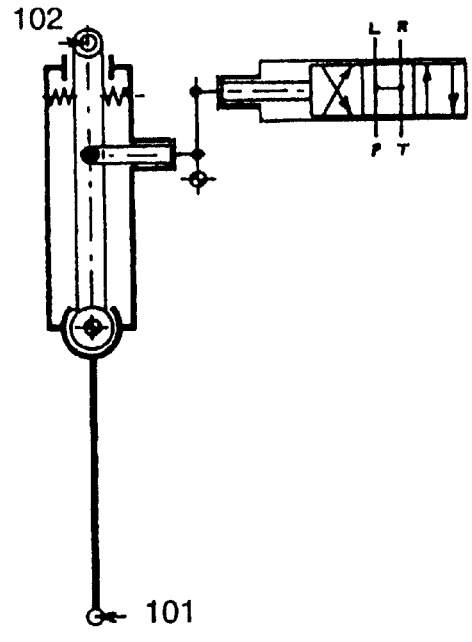
Fig. 22

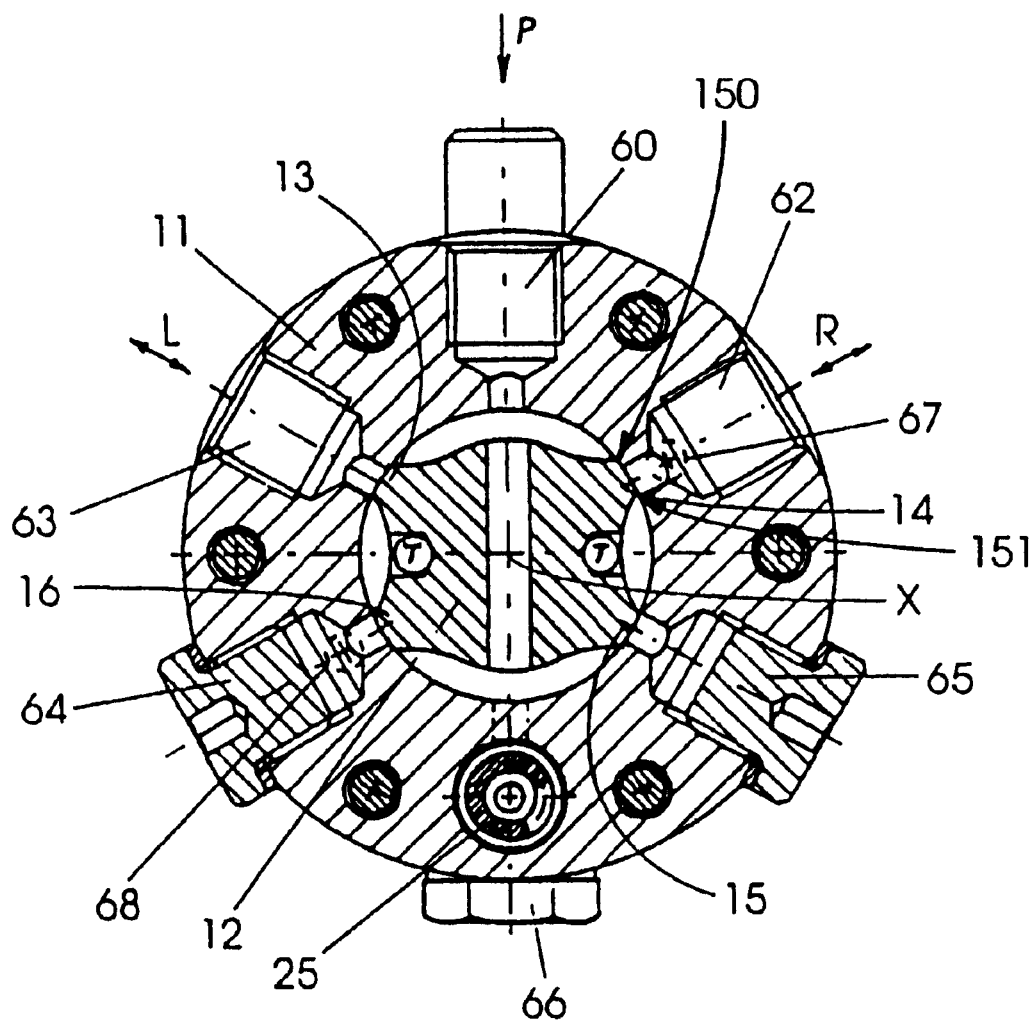
Fig. 23b
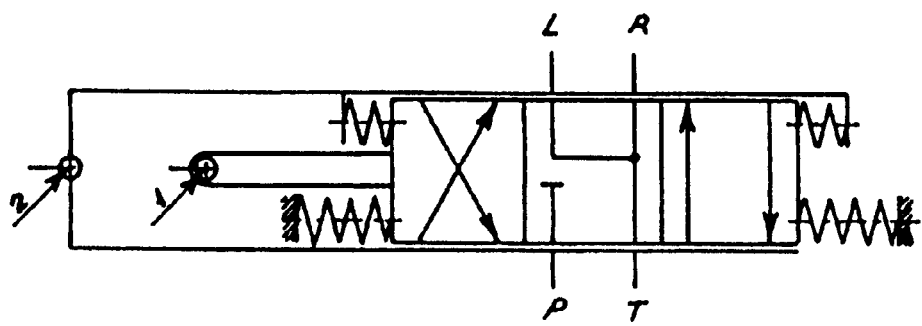

ROTATING OLEODYNAMIC DISTRIBUTION SYSTEM FOR THE STEERING OF REAR AXLES OF VEHICLES

TECHNICAL FIELD

The present invention relates to a device consisting of an oleodynamic distribution system of the rotating type.

More particularly, the present invention relates to an oleodynamic distribution system of the rotating type that can be fit into applications of the oleodynamic type such as for example power steering systems of one or more steering rear axles of vehicles.

The present invention finds a particularly suitable application in the fields of mechanical industry, agriculture and transportation.

BACKGROUND ART

Italian patent application N. EO92A327 discloses a power steering system for power steering systems of the rear steering axle of a vehicle, particularly of a heavy vehicle.

It is the aim of the invention described in the present application that of connecting the front steering system of the vehicle comprising a hydraulic power steering system with the rear steering axle of the vehicle itself, so that a steering manoeuvre carried out by the driver operating on the steering wheel causes a simultaneous and coordinated rotation of the front wheels and of the rear steering axle of the vehicle.

In order to accomplish the above aim, according to present invention, the action is exerted by a double effect actuator whose body is connected to an arm that is rigidly coupled to the pivot that allows the rotation of the wheel about a vertical axis, said arm being connected to a corresponding arm for the rotation of the other wheel of the rear axle by a suitable connecting bar.

The piston encased inside the actuator is fixed to the axle of the vehicle by the end of the stem, and it cuts the inside volume of the body into two distinct chambers, each of which being suitable for being filled with pressurised oil with an oleodynamic control and in so doing for causing the displacement of the body of the actuator which in turn causes the simultaneous rotation of the two wheels of the axle.

According to a form of embodiment of the present invention, the lever of the hydraulic power steering system of the vehicle is connected to the actuator by a flexible cable of the Bowden control type, one end of which is directly connected to the slide valve of the two way and three position axial translation movement distribution system that is fixed onto the body of the actuator; in such a configuration, the steering manoeuvre carried out by the driver on the steering wheel is transmitted to the slide valve of the distribution unit by the hydraulic power steering system and by the Bowden control cable, as a consequence of which the slide valve of the distribution system is displaced, connecting the hydraulic power circuits which are suitable for forwarding the pressurised oil to either of the chambers in the double effect actuator in order to operate the steering of the rear axle.

A system that is similar to that described above was disclosed by European patent application n. EP-A-710601.

In the above case the steering system, that also exploits a double effect actuator, can be controlled by a two way, three position axial distributor, and it is applied to the steering of one or more axles in a vehicle semitrailer or trailer.

In both cases the power chassis front wheel steering angle or, for a semitrailer, the fifth wheel rotation angle, is transferred to said axial distributor by suitable means, for example a Bowden control cable driven by a double effect second actuator.

European patent application number EP-A-786394 discloses an improvement of the system object of the above cited European patent application n. EP-A-710601.

The improvement is therein given by the presence of a double effect actuator which connects between the rotation pivot of the wheel to drive and the axial distribution system; therefore, consequently, the axial distribution system is in this case connected to two double effect actuators, both of which with their bodies rigidly coupled with the rotation pivot of a single wheel.

The distribution of the single pressures among the several hydraulic power circuits therein makes it possible to obtain the steering precision.

Document U.S. Pat. No. 4,955,630 which was filed prior to the above cited European patent applications, discloses a steering system for one couple of semitrailer axles.

Even in this case a sensor for the detection of the angular position of the fifth wheel is provided, with respect to the semitrailer, as well as a Bowden control cable in order to transfer the rotation to an axial type distribution unit.

A double effect actuator is driven by said distribution unit in order to simultaneously set the wheels of one or more axles in rotating motion.

Other steering systems for third axles of power chassis, or for single or multiple axles of semitrailers and trailers provided with at least a two way and three position axial distribution unit are respectively disclosed in European patent n. EP-B1-386370, in U.S. Pat. No. (A) 5,244,226, in international PCT patent N. WO-A-8907065 and in Italian patent N. IT-A-1263504.

The above cited steering systems which are provided with a distribution system of the axial type wherein there is found to be present a slide valve that can be translated along a straight line have some remarkable drawbacks and disadvantages that limit their use, complicate their general mechanics of the system and do not make it possible to envisage the possibility to find additional safety systems provided in case of faults or failures.

In particular and with reference to the systems respectively described by Italian patent application N. BO92A327 and by European patent applications N. EP-A-710601 and N. EP-A-786394, these are provided with an actuating cylinder whose stem is fixed, whereas the movable member is made up by the body of the cylinder itself.

This solution which is made inevitable by the hydraulic control of the steering system of the axle to be rotated requires the employment of a purposefully built actuating cylinder. This results to be expensive, and it does not allow the use of the cylinders normally found in the trade.

Furthermore, in this case the two way and three position distribution system must necessarily be rigidly coupled with the body of the cylinder, that is to the mobile part; for this reason, the Bowden control cable that rigidly connects the hydraulic power steering system lever to the slide valve of the distribution unit must be provided with an expansion member located between the hydraulic power steering system lever and an end of said cable, in order to allow the hydraulic power steering system lever to move even when the body of the cylinder and the wheels of the rear axle are blocked in their most unfavourable position.

The above solution further complicates the general mechanics of the system, raising its costs and introducing possible causes for failures and faults.

Furthermore, conventional systems are not provided with any type of safety device that operates in case of faults or breakdowns of the Bowden control cable or of other connection members during the steering; when such a possibility occurs, there is found to occur an immediate dangerous circumstance because the axle cannot be controlled by the hydraulic power steering system of the power chassis and its wheels tend to remain steered towards where they were directed at the moment the breakdown occurred.

To complete the present section, attention is drawn to the fact that there are found to be known in the art two way and three position distribution systems of the rotating type; said rotating distribution systems are used for hydraulic power steering systems of both light and heavy vehicles, and they fulfil their only function to turn the lights of the distribution system on and off in order to direct the pressurised oil to either of the chambers within a power cylinder.

For this function that they must fulfil, said rotating distribution systems have an extremely limited rotation angle, namely in the 5°–6° range, and the movable members are provided with suitable stops that limit the rotation to the above indicated values.

Document DE-A-2655379 discloses a hydrostatic system in which the main shaft (1) is connected to the steering wheel (115) that causes an angular rotation of about 6 to 8 turns.

The hydraulic distribution group is formed by three components, i.e.:

a fixed external body (4) comprising the joints to the hydraulic pipes;

an intermediate ring (6) for the hydraulic distribution, which is, on on side, mechanically connected to and controlled by said shaft (1), while on the other side it is connected to a distribution core (7) through the action carried out by a spring-loaded ball (9), that is incorporated in said intermediate ring, on a flaring of said distribution core. After reaching a minimal rotation torque, which is necessary for operating a motor-pump (12), which determines a radial displacement of ball 9, and after a rotation of about 4°–6°, which is necessary for operating the hydraulic distribution, the core is mechanically driven by the intermediate ring through a suitable pin (46);

a distribution core (7) which, on one side is mechanically connected to said intermediate ring and, on the other side, is connected to an internal gear of said motor-pump 12.

It can be noted that said motor-pump group 12 is used as element for controlling the oil flow, and it is indispensable for controlling the whole hydraulic distribution. Without said motor-pump group 12 the rotative distributor (4-6-7-8-9-46) may not work, and the oil flow would permanently stay in a by-pass condition.

A similar distribution core, allowing a rotation of only 4°–6° is disclosed in document U.S. Pat. No. 4,705,129.

Document GB-A-2306927 discloses an hydraulic-electronic power steering system in which (see FIG. 1 of said document):

an electric motor-actuator-group (11) is operated by a regulating circuit (16) which, on its turn, is controlled by the signals coming from position 15 of steering wheel 14 and from position 17 of servomotor 9. The angular rotation is limited to a minimal value that is necessary for controlling the hydraulic distribution and for avoiding the yield of a torsion bar (10);

a rotative hydraulic distribution group comprising three coaxial components, i.e.: (a) an external fixed body (1) including the joints to the hydraulic pipes, and that, on one side, is mechanically connected to an intermediate ring (2") and to said torsion bar (10) and, on the other side, is connected to the stator of the electric actuator-motor (10); (b) an intermediate ring (2") for carrying out the hydraulic distribution, which is locked on said body (1) and which is mechanically connected to a distribution core (2') by means of said torsion bar (10); and (c) said distribution core (2') which is connected to the rotor of the electric actuator-motor (10). The rotation torque created by the eletric actuator-motor (10) determines the relative rotation between said core (2') and the intermediate ring (2") for an angle comprised between 1° and 6°, corresponding to the angle which is strictly necessary to control the hydraulic distribution. Furthermore, a rotation exceeding 6° may not be tolerated by the torsion bar.

Documents EP-386370, EP-A-845403, EP-A-710601, EP-A-786394 and DE-A-3837981 refer to power steering systems in which the distribution core carries out a linear translation movement along its axis, relative to its fixed distribution body. Said linear movement does not exceed 3 mm, which is only sufficient for directing the oil flow towards either chamber of the actuator controlling the wheels' rotation. This short movement of about 3 mm corresponds to a wheel's angular rotation path of only 1°–2°.

DESCRIPTION OF THE INVENTION

The present invention aims at overcoming the disadvantages and drawbacks of the prior art, and at proposing an oleodynamic distribution system of the rotating type that has a particularly interesting application in the field of steering systems for rear axles of vehicles, as well as for axles in trailers and semitrailers.

More specifically, the present invention aims at proposing an oleodynamic distribution system of the rotating type that makes it possible to use an actuating cylinder normally found in commerce for the steering power control of the axle. Another important feature of said cylinder is that, in case of a steering control transmitted by a Bowden control cable, it makes it possible to avoid the employment of expansion members in order for a full angular movement of the hydraulic power steering system lever to occur even when the wheels of the rear axle are blocked in their most unfavourable position.

A further aim of the present invention is that of proposing a distribution system that contrary to any other solution known in the art is also capable of being positioned on the driven axle, in so doing obtaining a direct transmission of the steering actuation and remarkably reducing the mechanical components of the steering system.

A further aim of the present invention is that of proposing a distribution system provided with safety means that make it possible to take the driven wheels of the rear axle back to the neutral straight ahead travelling position automatically, avoiding dangerous and even life-threatening deviations of the vehicle.

A further aim of the present invention is that of proposing an oleodynamic distribution system of the rotating type that acts over a much wider rotation angle, that is anyway higher than the rotation width of the wheels to control of the axle of the vehicle, so as to be capable of controlling the steering of the wheels over their whole rotation angle.

A further aim of the present invention is that of supplying a distribution system of the rotating type that is suitable for being used for applications where the steering control signal is transmitted both mechanically and electronically or electromechanically.

This is accomplished by dint of a distribution system of the rotating type having the features given in the independent claim.

Dependent claims outline particularly advantageous forms of embodiment of the device according to the present invention.

The oleodynamic distribution system of the rotating type according to the present invention comprises a first section called "core", which is pivotal around a rotation axis and connected by a suitable mechanical member, for example a lever that is rigidly coupled with the rotation axle, to the system that supplies the control to the device itself; depending on the specific case, the core is connected to the front wheel steering system of a vehicle by dint of suitable mechanical or electronic or electromechanical means.

Said core is encased in a second section on which the conduits for forwarding the pressurised oil towards the two chambers of an actuating cylinder; according to different forms of embodiment, in the field of steering systems for rear steering axles in vehicles, or in trailers or semitrailers, the core is designed so as to allow a hydraulic drive angular rotation which is as wide as 58°, both clockwise and anticlockwise, with respect to a conventional equilibrium and starting position, corresponding with a driven wheel situation that are controlled aligned in the same direction, that is of a vehicle that is moving in a straight-ahead direction.

Therefore, the distribution system according to the present invention succeeds in having an angular clearance that is wider than the steering angle of the wheels themselves over the whole angle width within which the wheels themselves are turned.

Furthermore, said angular excursion allows the complete angular movement of the hydraulic power steering system lever, even with the rear axle wheels blocked in their most unfavourable position.

Attention is now drawn to the fact that for the purpose of the present application, by rotation of a wheel it is meant in any case the rotation of the wheel itself around an axis that is substantially vertical, said steering to obtain a change in direction of the vehicle onto which the wheel is fixed.

According to an aspect of the present invention, the driving action exerted onto the core by the angular movement of the wheels of the front axle causes the passage of pressurised oil to one of the chambers of a double effect actuator which in turn causes the rotation of the wheels of the driven axle until the second section that is connected to said wheels of the driven axle has rotated by an angle that is identical with that by which the core has been rotated.

According to the present invention, on the driving shaft a couple of sunken surfaces opposite to one another is provided. These surfaces are suitable for cooperating with a sphere onto which the end of a spring acts, said spring having its other end rigidly coupled with the second body of the distribution system.

Such an arrangement creates a centring couple of the hydraulic distribution; in fact, when the sphere is in contact with both the sunken surfaces at the same time, the core is centred with respect to the casing, with the ensuing centring of the hydraulic distribution.

During the driving action, the sphere is in contact with just one misaligned surface that activates a couple reacting to the driving, that is proportional to the spring load and to the inclination of the sunken surface, this resulting in a force that tends to automatically take the hydraulic distribution to its centred position, therefore to equilibrium, when the rotating action of the driving shaft comes to an end.

The male rotating distribution unit is hydraulically balanced on account of its constructive shape, therefore under whatever pressure the hydraulic pushes form all directions have a resulting force equalling to nought.

This implies several marked advantages from the manoeuvring point of view, this being easy and light, as well as in terms of mechanical reliability and duration of the device according to the present invention.

According to an advantageous form of embodiment of the present invention, the core is rigidly connected to its own driving shaft by a joint of the "Oldham" type, in a not constraining way, such a thing allowing the core to keep hydraulically balanced or in equilibrium, within the distribution system and allowing it not to be affected by possible strains coming from the outside environment.

According to a further particularly advantageous form of embodiment of the present invention, in case the application for the steering of the rear axles of the power chassis or of axles of trailers or semitrailers, the distribution system is provided with an automatic safety device which is capable of automatically taking the wheels to their equilibrium position that corresponds with the straight ahead travelling condition, in case of fault or breakdown of the steering control transmission system.

In particular, on the driving shaft of the distribution unit there is found to be located an automatic positioning member with respect to its own original position, corresponding to a straight ahead travelling position of the driven axle.

Such a positioning member comprises a spring that depending on the specific case, can be tangentially or axially strained with respect to the position of the driving shaft; when strained, such a spring exerts a force onto the core that tends to take it back to its original position.

Therefore, wherever there were found to occur a lack of electronic control or of the mechanical drive because of a breakdown or failure of the Bowden control cable, this implying a disruption of the connection between power chassis and controlled axle, said spring ends up acting automatically taking the core back to its position that corresponds with its straight ahead and centred travelling position of the wheels, in so doing avoiding dangerous changes of direction of the vehicle.

DESCRIPTION OF THE DRAWINGS

Other features and advantages of the present invention will be more evident from the reading of the following description of some forms of embodiment of the invention, given by way of not limiting examples, with reference to the drawings shown in the appended tables, where:

FIG. 4a illustrates a side cutaway view of a safety mechanism connected to the driving shaft of a distribution unit device according to the present invention;

FIG. 10 illustrates a functional scheme of a rotating distribution system according to the present invention as it looks when it is applied to a steering control system with mechanical transmission when misaligned from the rotation axis of the wheel of the driven axle, as compared with the functional scheme of an axial distribution system of a type known in the art;

FIG. 11 illustrates a scheme that is similar to that given in FIG. 10, with the device according to the present invention located on the driven axle to be rotated, and compared with the functional scheme of an axial distribution system known in the art;

FIG. 12 illustrates a functional scheme of a rotating distribution system according to the present invention, as it looks like when applied to a steering control system provided with electronic transmission and fixed in a misaligned position from the rotation axis of the wheel of the driven axle, as compared with the functional scheme of an axial distribution unit of a type known in the art;

FIG. 13 illustrates a scheme that is similar to that of FIG. 12, with the device according to the present invention fixed onto the driven axle to rotate, and compared with the functional scheme of an axial distribution system of a type known in the art;

FIG. 22 shows a functional scheme of a distribution unit device of the rotating type according to a further form of embodiment of the present invention;

FIG. 23b illustrates a section along line A—A of FIG. 1, precisely a further version thereof that makes it possible to use a circuit with an oleodynamic system provided with an accumulator.

DESCRIPTION OF SOME FORMS OF EMBODIMENT

Figure 1:
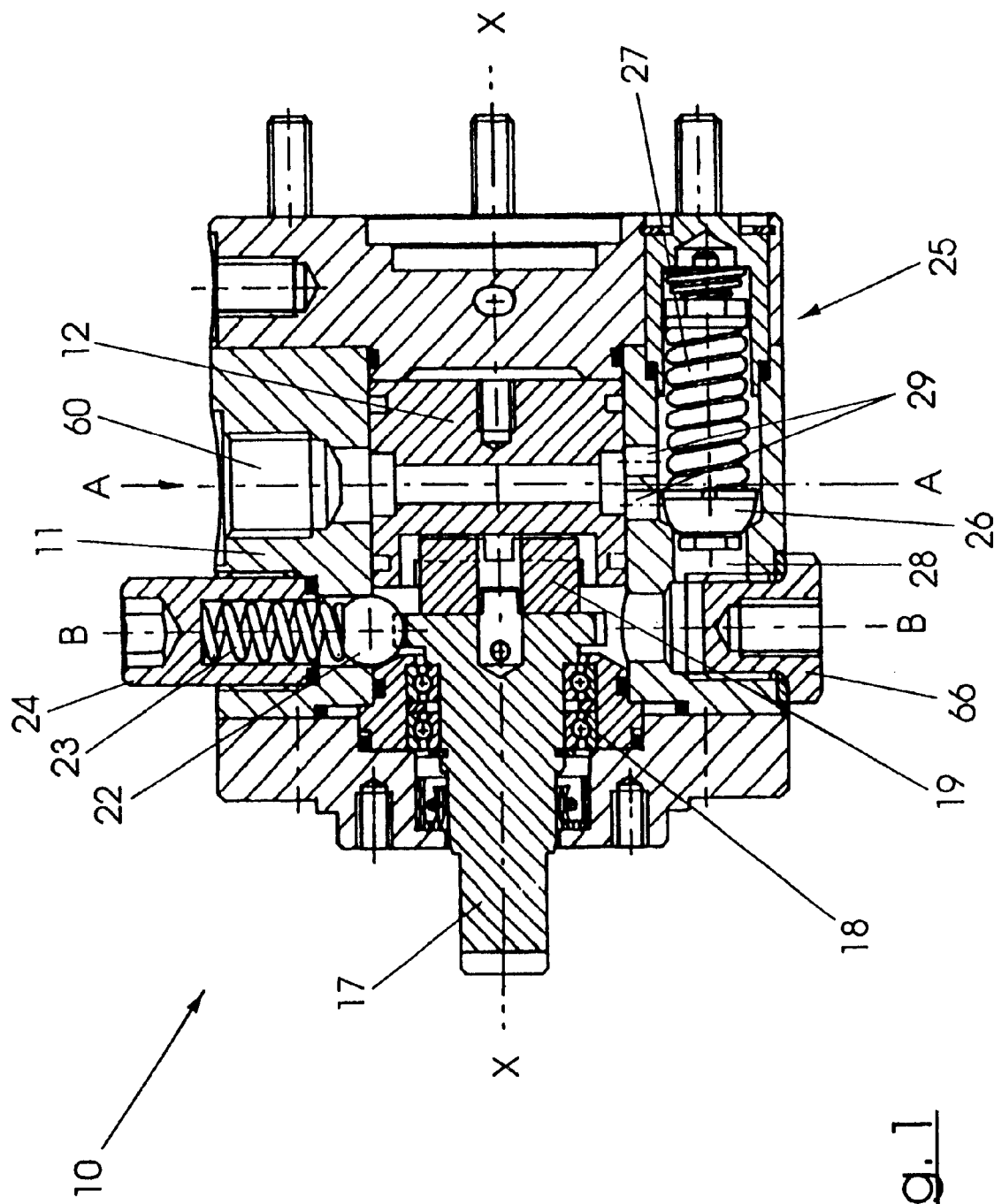
FIG. 1 illustrates a side cutaway view of an oleodynamic distribution system of the rotating type according to the present invention.

As it is shown in FIG. 1, reference numeral 10 generally indicates an oleodynamic distribution system of the rotating type according to the present invention.

Distribution unit 10 comprises a metal casing 11 that is hollow inside and directly or indirectly connected to pivot 50 (see for example figures from 14 to 21) that allows a rotation about a vertical axis of a rear wheel 51 belonging to a rear steering axle of a power chassis or of a trailer or semitrailer of a vehicle.

Within the volume limited inside casing 11 there is found to be present a member 12, which rotates about axis X, and that will be hereafter defined as "core".

Core 12 (reference is made to FIG. 2) is cylindrically shaped, and on its side surface there are found to be present four cavities that define four respective hydraulic distribution guides 13, 14, 15, 16 positioned at hydraulic equilibrium of device 10, in correspondence with as many holes made in casing 11, whose function will be detailed below.

In so far as the description of the present invention is concerned at this very stage, it is important to emphasise the fact that each of guides 13–16 does not close its corresponding orifice completely, on account of the fact that an approx. 0.5 mm wide opening is always kept open, even in an equilibrium position, said opening allowing the passage of oil between the several chambers created inside hollow casing 11, between core 12 and the inside surface of hollow casing 11.

Further, core 12 is axially connected to a driving shaft 17 joined to casing 11 by dint of a couple of ballbearings 18; control shaft 17 is itself driven by a transmission device of an electronic or electromechanical type that transfers the steering manoeuvre effected by the driver of the vehicle to device 10 for the following steering of wheel 51.

According to an advantageous form of embodiment of the present invention, the connection between core 12 and driving shaft 17 occurs by dint of an Oldham coupling 19 placed between said two elements.

Such a coupling 19 avoids that possible movements along a radial direction of driving shaft 17 are transferred to core 12; therefore, the rotating motion effected onto shaft 17 is the only thing transferred to core 12.

Figure 3:
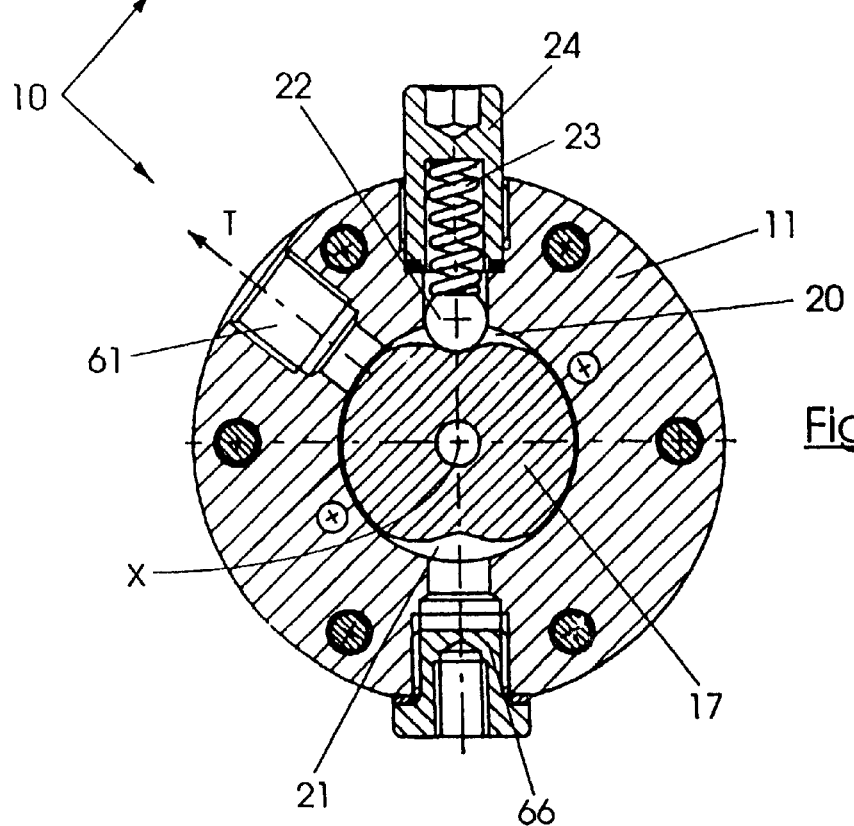
FIG. 3 illustrates a cutaway view along line B—B of FIG. 1.

In correspondence with the connection with coupling 19, lower end of shaft 17 has an essentially cylindrical shape; however, as it is clearly visible from FIG. 3, the side surface of said lower end is slightly lower and misaligned in correspondence with the two opposite poles, in so doing forming a couple of cavities 20, 21.

Pushed as it is by a compression spring 23 that abates inside the cavity of a threaded nut 24 and coupled as it is to casing 11 of device 10, a sphere 22 acts inside one of said cavities 20, 21 so as to exert a push onto the driving shaft that tends to take shaft 17 itself to an equilibrium position 17, once this is rotated around axis X, in a stable equilibrium position as it is shown in FIG. 3, this on account of the presence of sunken surfaces which the lower end of shaft 17 is provided with.

As it can be easily observed on looking at the higher part of the respective figures from 14 to 21, rotating distribution system 10 according to the present invention is inserted into an oleodynamic circuit fed by a pump 31 which is activated by a suitable motor member 30, which is generally made of the internal combustion engine of the vehicle whereon the axle steering system is located, or by another feeding device that is not shown, such as an electric pump for example.

The circuit comprises a pump 31, delivery adjustment valve 32, a tank 33 provided with filter 33 and a main electric valve 34; distribution system 10 is suitable for funnelling the oil circulating inside the oleodynamic circuit into one of respective chambers R, L formed inside actuating cylinder 40 whose body 41 is constrained to the axle of the vehicle and whose stem 42 is articulated onto a lever 52 that transfers the translation movement of stem 42 to rotation axle 50 of driven wheel 51.

Said wheel is connected to the other wheel 54 of the axle to be steered by a suitable transmission bar 53, as a suitable mechanism 55 is possibly interposed, said mechanism being itself known in the art and not being part of the present invention, which is controlled starting from a compression air oleodynamic source, in order to block the wheels of the axle in a straight ahead travelling position when the vehicle is travelling at a speed that is higher than a predetermined limit.

An oleodynamic circuit of the type described above must further comprise a parallel connected pressure limiting valve and an anti-cavitation valve, downstream from main electric valve 34.

According to an advantageous feature of the present invention, casing 11 of rotating distribution system 10 comprises a cavity within which a member 25 simultaneously forming a pressure limiting valve and an anti-cavitation valve is located (reference is made to FIGS. 1 and 2); said member 25 is connected to the pressurised chamber inside which core 12 is located, by a couple of orifices 29, and it further connects to the exhaust chamber 28 when head 26 of the double valve opens.

Figure 2:
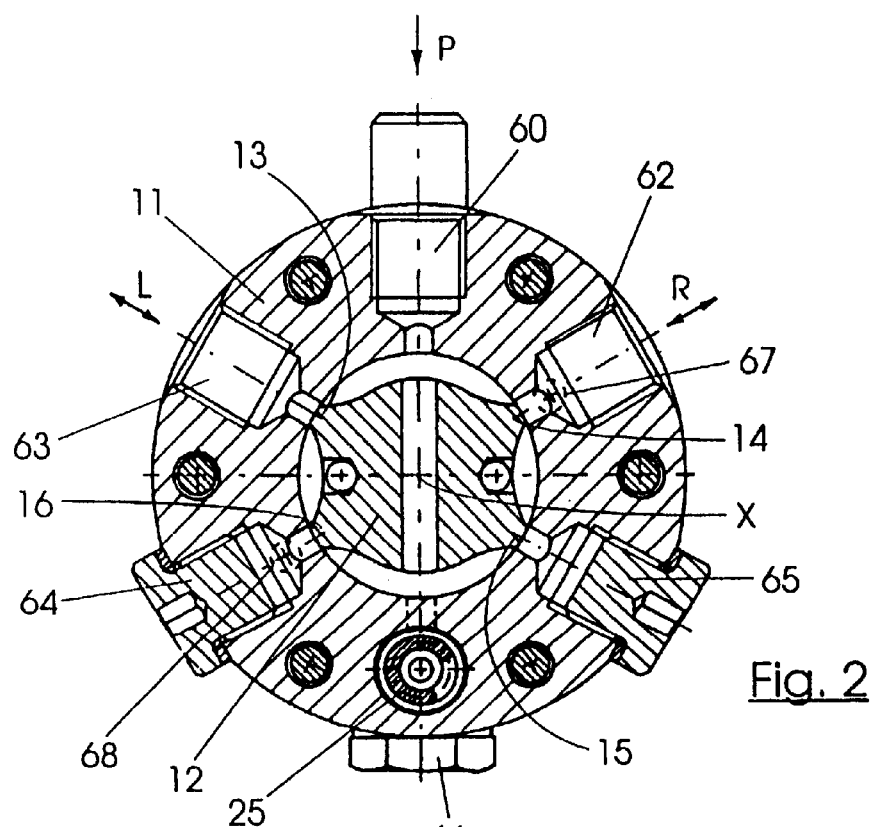
FIG. 2 illustrates a cutaway view along line A—A of FIG. 1.

Still with reference to FIGS. 1, 2 and 3, distribution system 10 comprises a first connector 60 for the inlet of the pressurised oil coming from main pump 31 (FIGS. 14–21), a second outlet or return T connector 61, as well as a third connector 62, connected by a suitable piping to chamber R of actuating cylinder 40, and a fourth connector 63, connected to chamber L of actuating cylinder 40 by a suitable piping.

Furthermore, as it is shown by the figures themselves, rotating distribution system 10 is further provided with a fifth and sixth connectors 64, 65, which in the form of embodiment shown are stoppered by suitable seals; said connections can be possibly employed for actuating a second activation cylinder, in case such an item is provided, too.

Finally, device 10 is provided with a seventh connection 66, stoppered by dint of a suitable seal, that can be used as an alternative return of the oil to the tank instead of connection 61.

According to the present invention, opposite connections 62 and 64, as well as opposite connections 63 and 65 are respectively connected by dint of suitable passages that bore through core 12 and that are useful in order to equilibrate that pressure in the several chambers of the distribution unit; in FIG. 2 the ends of said passages are shown in dashed lines 67 and 68.

With particular reference to FIGS. 2 and 3, the general functioning of rotating distribution system 10 according to the present invention will be detailed.

Then some particular forms of embodiment and of application of device 10 itself will be illustrated.

As it was previously highlighted, in FIGS. 2 and 3 device 10 is in an equilibrium position; for the sake of clarity of the description given hereafter, it is defined that this position represents the origin of a steering manoeuvre of a vehicle in correspondence with a driven axle onto which the device according to the present invention is fixed.

Furthermore, for the purpose of the present invention, driving shaft 17 is defined as being connected to a generic transmission device that thereto transfers the steering control coming from the front axle or from the fifth wheel; casing 11 of distribution unit 10 is taken as being directly or indirectly connected to the axle of the wheel to steer; connections R and L from casing 11 of the distribution system are taken to be connected to two opposite chambers of a power activation cylinder that acts on the wheel in order to induce it to rotate around said axis; connections 60 and 61 of delivery P and return T of distribution system 10 are inserted into an oleodynamic circuit within which pressurised oil form a pump circulates.

In such a situation the distribution system is in an inactive or by-pass position, and the oil distributes in a balanced way between the chambers of the distribution system on account of the passage openings on the four hydraulic distribution guides 13, 14, 15, 16 of core 12 and it further freely returns to the tank via connection 61.

Driving shaft 17 is supposed to be rotated, starting from a steering drive coming from the power chassis, by a predetermined angle and normally in the range between 0° and 58° clockwise and around the X axis.

Then core 12 which is axially constrained to shaft 17 rotates by a corresponding angle, and distribution guide 14 progressively uncovers the orifice into connection 62 proportionally to its rotation angle, in so doing increasing the area available to the oil for passage, said oil coming from delivery connection 60; simultaneously, guide 14 reduces its area available for passage of the oil flowing towards exhaust connection 61.

At the same time, distribution guide 13 progressively covers the orifice of connection 63, reducing the area made available to the passage of the oil from delivery connection 60, and guide 13 increases the oil passage area towards exhaust connection 61 with the result that the pressurised oil coming from connection 60 directs towards chamber R of the actuating cylinder, causing the progressive discharge of chamber L and the movement of the stem of the cylinder itself.

As that stem (FIGS. from 14 to 21) is connected to wheel 51 to be steered, said wheel is rotated around its own vertical axis 50, also dragging second wheel 54 of the axle.

During the rotation, core 12 is subjected to an antagonist force that induces it to rotate around the X axis and that tends to take it back to the equilibrium position, due to the fact that sphere 22 (FIGS. 1 and 3), subjected to the push exerted by spring 23, is not in depression 20 provided at the lower end of shaft 17, but it is on one of the surfaces forming depression 20 itself. Consequently, core 12 is subjected to a force that is proportional both to the force exerted by spring 23, and to the depression of the surfaces in contact with sphere 22, that tends to re-establish the equilibrium position wherein the sphere 22 is found in the hollow.

The result of such an action is that following a steering manoeuvre, the core rotates and causes the actuation of the activation cylinder, that determines the rotation of the wheels of the driven axle until the section of the distribution unit which is connected to said wheels of the driven axle has rotated by an angle which is identical to that by which the core has rotated.

The equilibrium condition with the hydraulic flux in a by-pass situation is re-established, even if the wheels of the vehicles are steered.

This remarkably contributes to the construction of a distribution system that is sturdy and reliable and that needs very little maintenance as well as it allows to accomplish the aims of the present invention.

Figure 4:
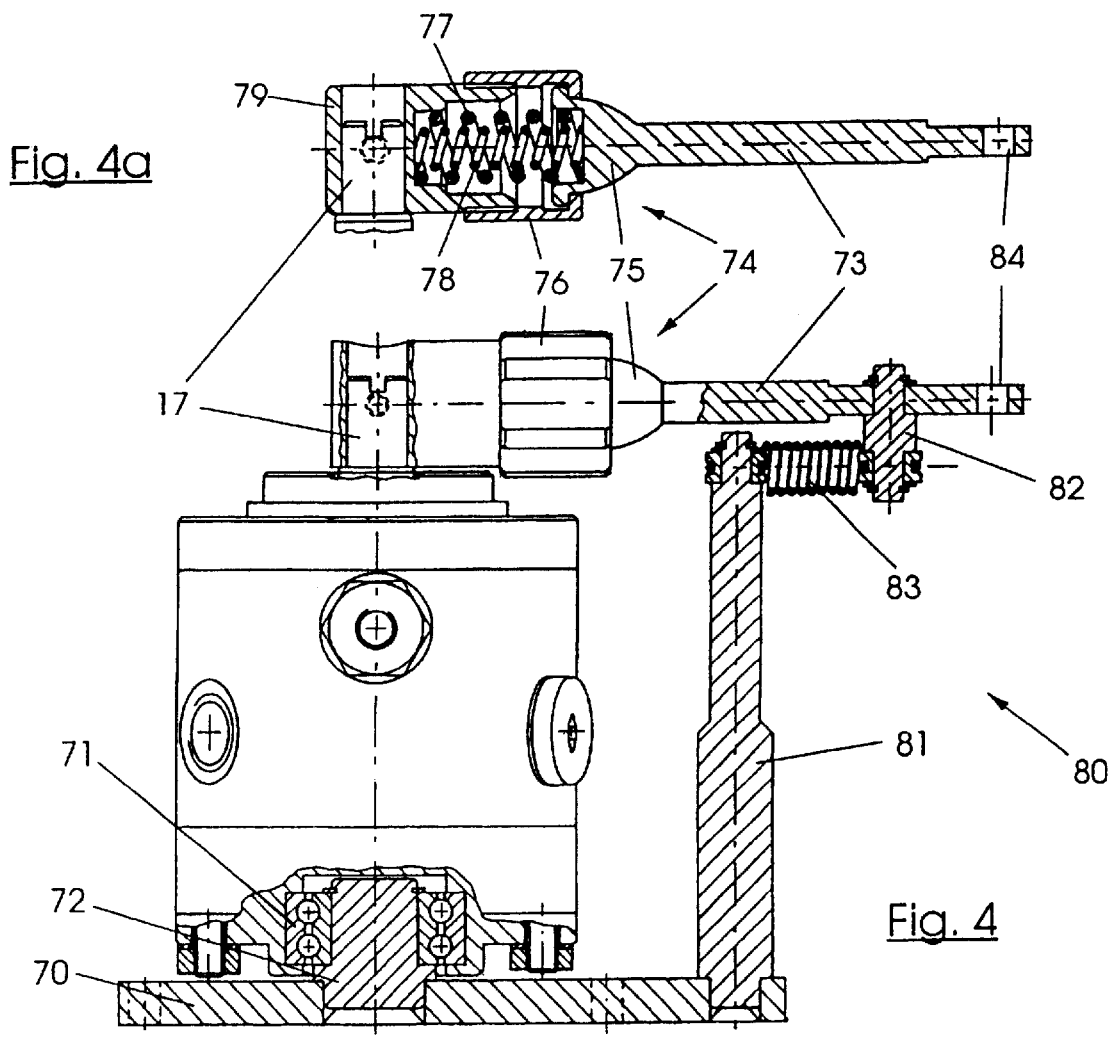
FIG. 4 illustrates a partially cutaway view of a distribution system according to the present invention, as it is applied to an axle in a misaligned position with respect to the rotation axis of a wheel of the driven axle.
Figure 5:
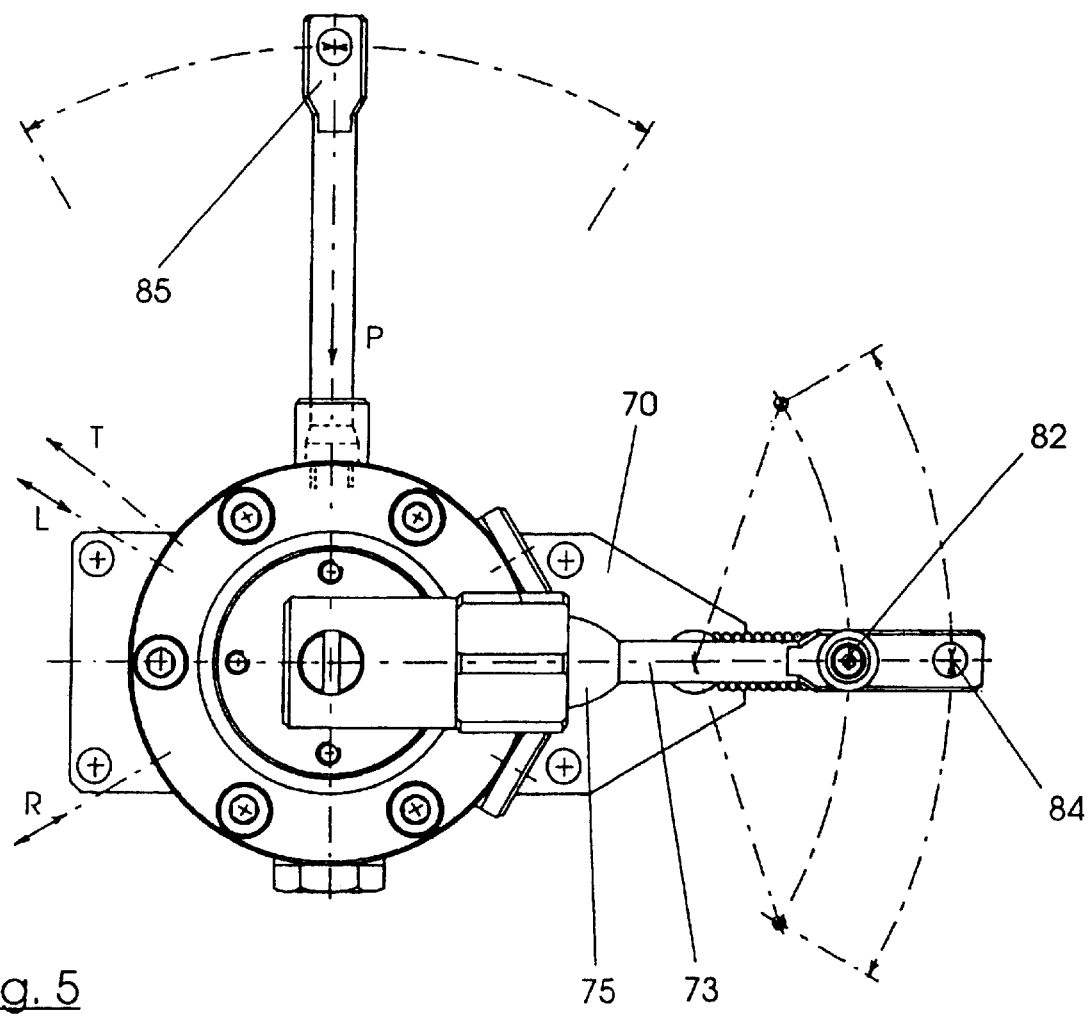
FIG. 5 illustrates a plan view from above of the device shown in FIG. 4.

FIGS. 4 and 5 illustrate a form of embodiment of the present invention, where distribution system 10 is fixed onto a base 70 which is separated from the vertical rotation axis of the wheel to be steered, said base 70 being for example fixed to the axle of the vehicle.

From the above figures it can be observed that device 10 is pivotally mounted onto a couple of ballbearings 71 around an X rotation axis consisting of a pivot 72 rigidly coupled to base 70.

Driving shaft 17 of the core is rigidly connected to a lever 73 with the interposition of a safety member 74 that makes up a couple limiting member, better shown in FIG. 4a, and that makes it possible to avoid breaking lever 73 or Bowman control cable 58 in case core 12 blocks inside the body of device 10.

Safety member 74 rules out this possibility on account of the fact that end 75 of the lever itself is cap-shaped, said cap having a base that is contained inside a hollow cylindrical section 76 and it cooperates with a couple of springs 77, 78 with parallel axes that abut inside said end 75 on the one side and inside a suitable slot of a cylindrical section 79 mounted onto driving shaft 17 and cylindrical body 76.

A possible torque onto lever 73 with the driving shaft blocked determines a rotation of the lever itself on account of the compression of springs 77, 78 and of the rotation of cap 75; as the rotation movement is by a rather limited angle that is normally narrower than 60°, there is no chance whatsoever to break lever 73.

According to this form of embodiment, distribution system 10 further comprises a safety system 80 that allows to take the driven wheels of the vehicle back to a straight ahead centred travelling position even in case the electronic control fails to operate or the transmission members break, said transmission members being for example the Bowden control cable that connects the hydraulic power steering system of the vehicle with control lever 73.

Safety system 80 comprises a first pivot 81 connected to a fixed point such as for example base 70 in FIG. 4 or to the axle of the vehicle, a second pivot 82 that is mounted onto lever 73, as well as a spring 83 that hooks by its ends to said pivots 81 and 82.

The arrangement of pivots 81 and 82 is such that spring 83 exerts a force that constantly tends to take lever 73 back to a predetermined central position (see FIG. 5), where the wheels of the driven axle of the vehicle are arranged in an aligned and centred position and in a straight ahead travelling situation.

In case of breakage of a transmission element during the steering manoeuvre, lever 73 which is connected to the transmission cable via its end 84, suddenly becomes disengaged and independent from the action exerted by the man at the steering wheel of the vehicle and a sudden dangerous situation creates.

On account of the presence of a safety system 80 this is avoided on the grounds of the presence of spring 83, that directly acts on lever 73 and induces core 12 (therefore all the wheels under control) to return to their centered and aligned position in a straight ahead travelling motion of the vehicle.

Besides the above mentioned members, a lever 85 can be seen in FIG. 5, which has one end constrained to the body of the distribution system, whereas its other end is mounted to the rotation axis of the wheel of the axle to be steered.

Figure 6:
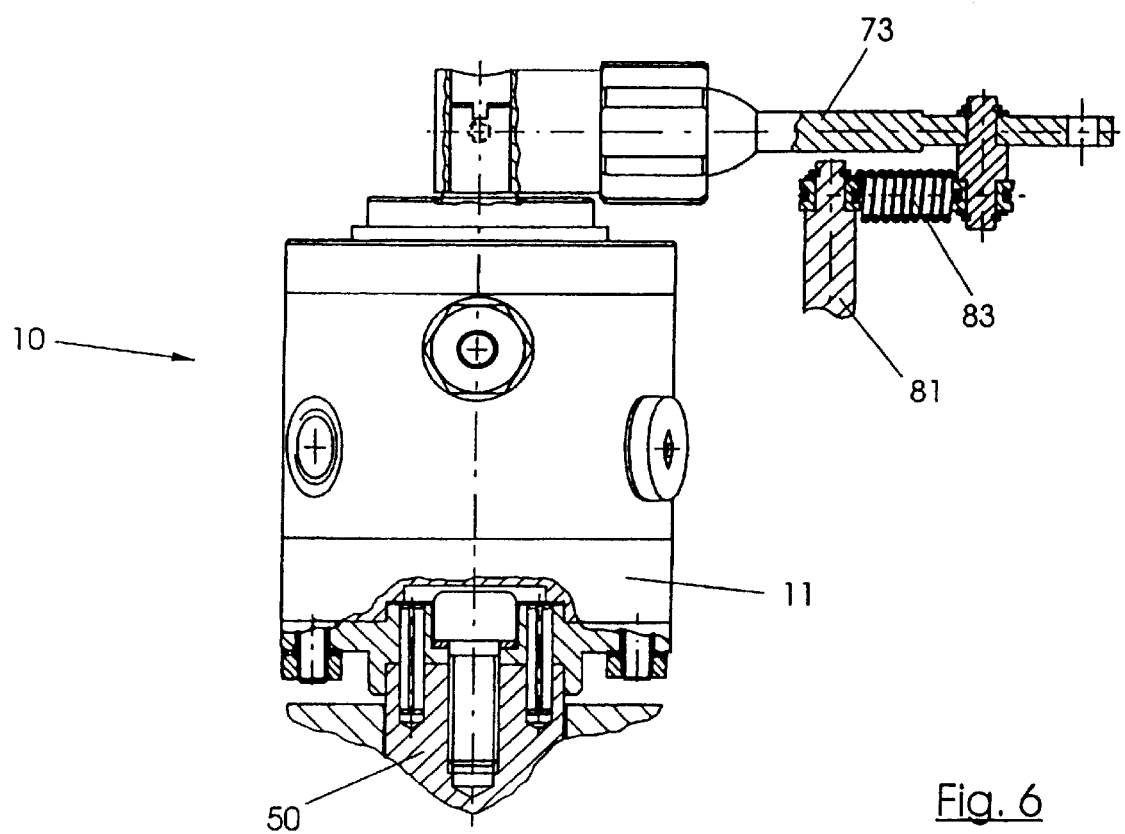
FIG. 6 illustrates a partially cutaway view of a distribution system according to the present invention, as it is applied in an aligned position to the rotation axis of a driven wheel.
Figure 7:
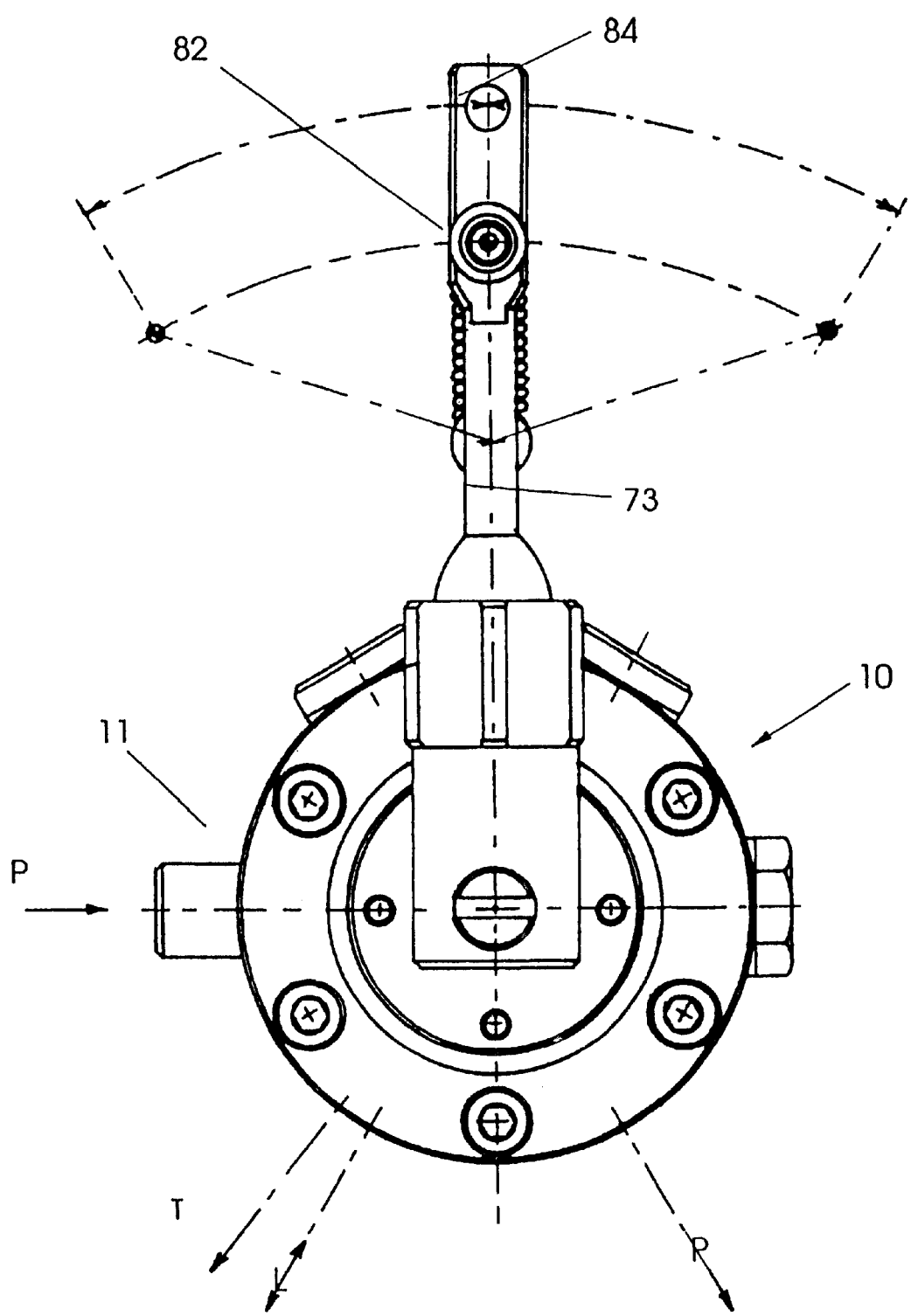
FIG. 7 illustrates a plan view from above of the device shown in FIG. 6.

FIGS. 6 and 7 illustrate another form of embodiment of the present invention, where casing 11 of distribution system 10 is directly mounted onto the vertical axis embodied by pivot 50, of the wheel of the driven axle, whereas the control of the core of device 10 takes place automatically, by dint of a Bowden control cable mounted at the end of lever 73 for example.

In such a case, following the action exerted by lever 73 onto the axis of the core, a reverse action occurs wherein casing 11 of the distribution system is directly rotated by axle 50 of the steered wheel.

This form of embodiment exemplifies the distribution system as pertains its essential features and it represents an important innovation to the present invention: there were not found to be known so far in fact any control devices that could be directly mounted onto the driven axle.

In this case safety system 80 with its wheel centring spring 83 is also visible; pivot 81 is mounted onto the axle of the vehicle.

Figure 8:
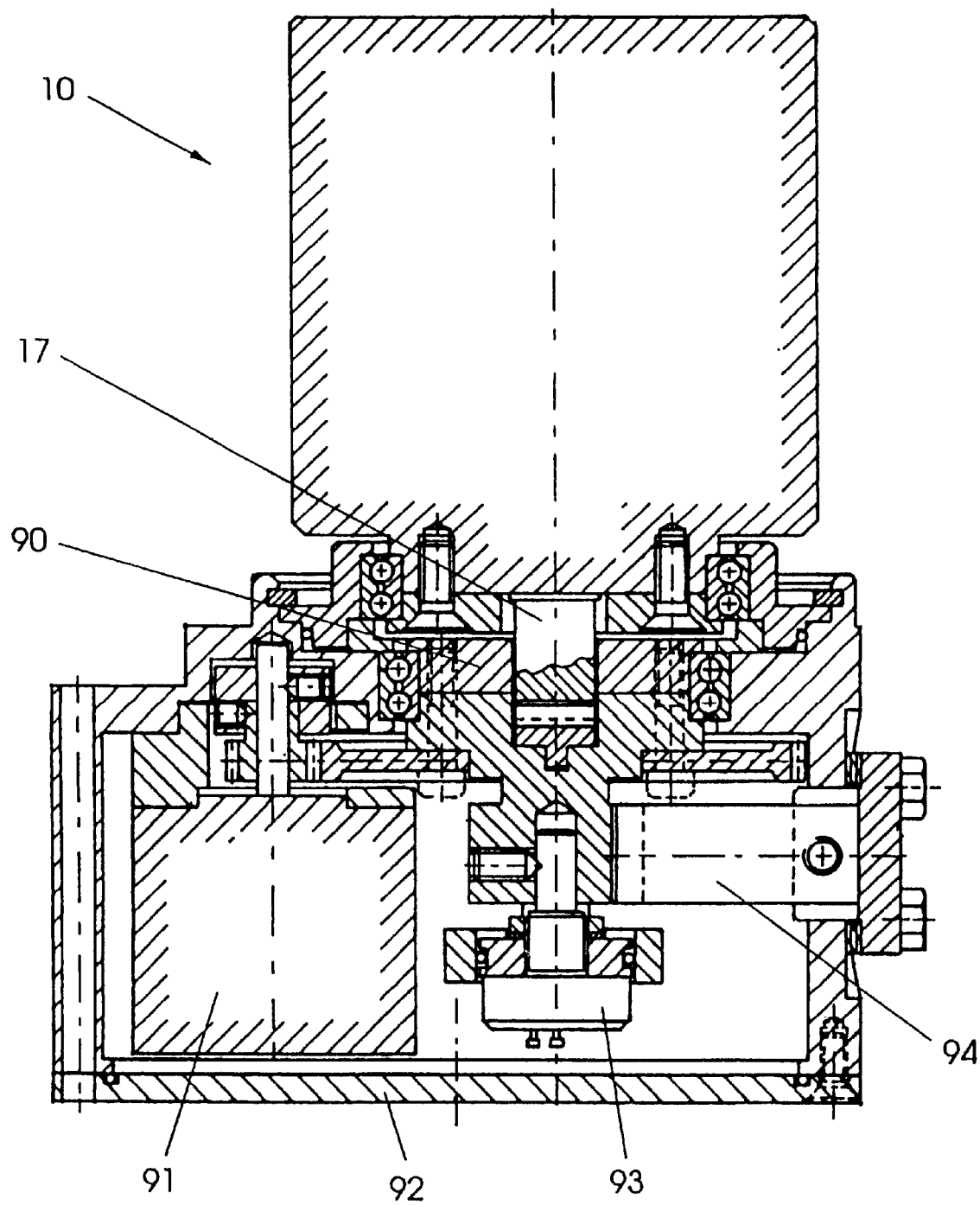
FIG. 8 illustrates a side cutaway view of a steering control system for axles of an electronic or electromechanical type, provided with a distribution system according to the present invention.
Figure 9:
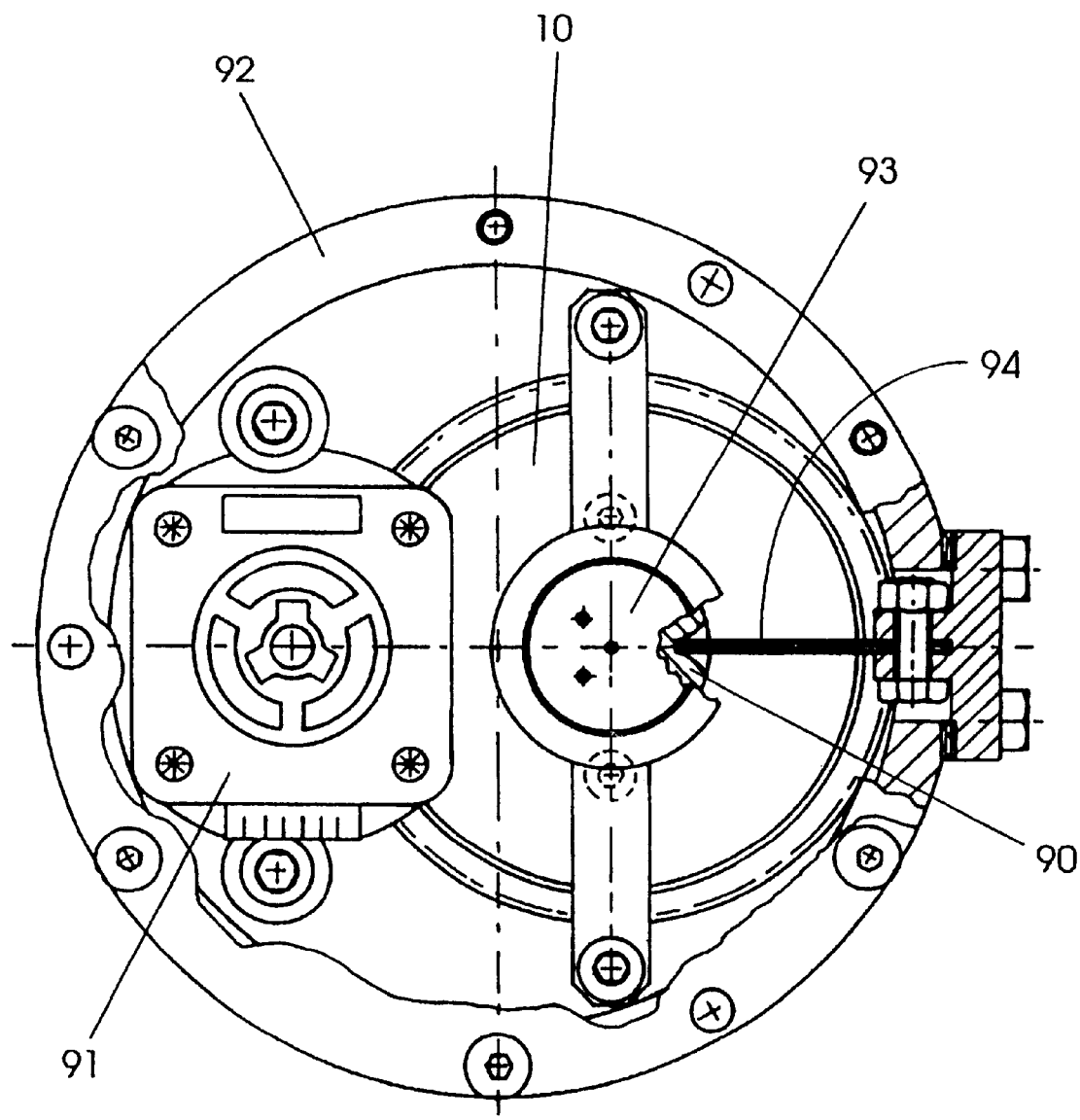
FIG. 9 illustrates a partially cutaway view from below of the control system shown in FIG. 8.

FIGS. 8 and 9 illustrate an application variant of rotating distribution unit device 10 according to the present invention, according to which the steering control is accomplished electronically.

In this case driving shaft 17 of device 10 is connected by a suitable reduction unit 90 to an electric motor 91 advantageously of the step type.

According to this form of embodiment, motor 91 and its members are mounted inside a cage 92 mounted to the axle of the vehicle, a position sensor 93 of driving shaft axis 17, a potentiometer for example, is mounted onto one end of shaft 17 itself.

Device 10 in this case operates in a way that is analogous to that already detailedly described with reference to the mechanically driven forms of embodiments, the only essential difference being that driving shaft 17 is in this latter case driven by reduction unit 90 instead of a lever.

In correspondence with the front or rear steering axle of the fifth wheel, a similar position sensor is located for the axle of the driving wheels; a suitable printed circuit board provided with reverse action comparison means sends a rotating driving signal to electric motor 91 that drives shaft 17 of the core by reduction unit 90, a reverse action signal being sent to said printed circuit board by sensor 93.

FIGS. 8 and 9 further illustrate a safety system for centring the wheels of a vehicle in case of breakdowns and faults incurred into by the transmission system.

More particularly, a torsion, compression or traction helicoidal spring or, as it is in this case, a leaf spring 94 is mounted by one of its ends to casing 92, whereas by its other end it acts onto shaft 17 by means of a portion of reduction unit 90.

In a way that is similar to the mechanical transmission case, spring 94 constantly exerts a force onto the core by driving shaft 17, said force tending to take it back to its original position so as to take the wheels of the driven axle back to a straight ahead travelling situation, in case the electronic control failed to operate or to operate properly.

Figure 14:
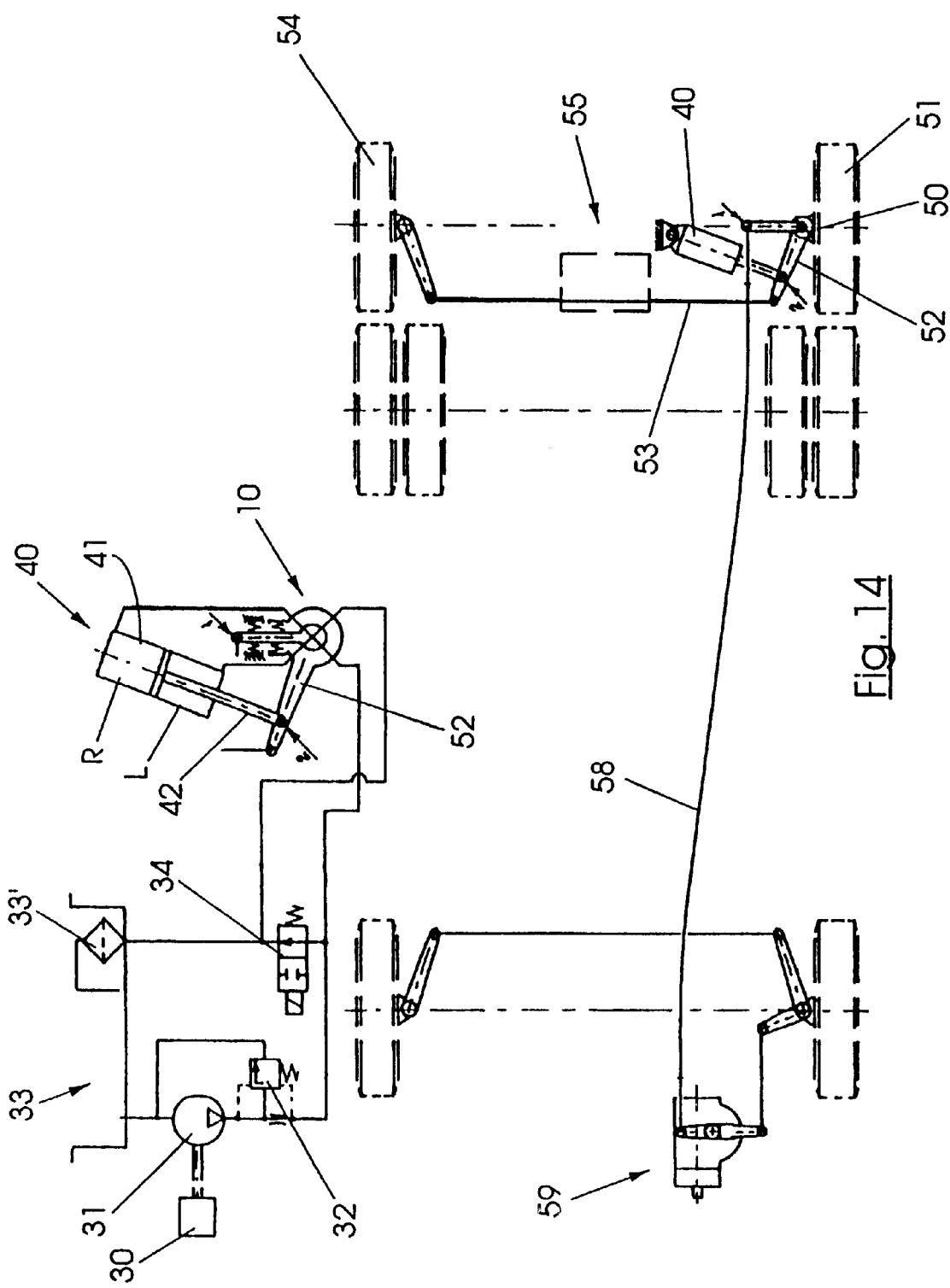
FIG. 14 illustrates a scheme that generally highlights the connection of a device according to the present invention, fixed onto the driven axle to rotate for an application of the third steering axle type driven in both travelling directions, the steering control transmission being guaranteed by a Bowden control cable.
Figure 15:
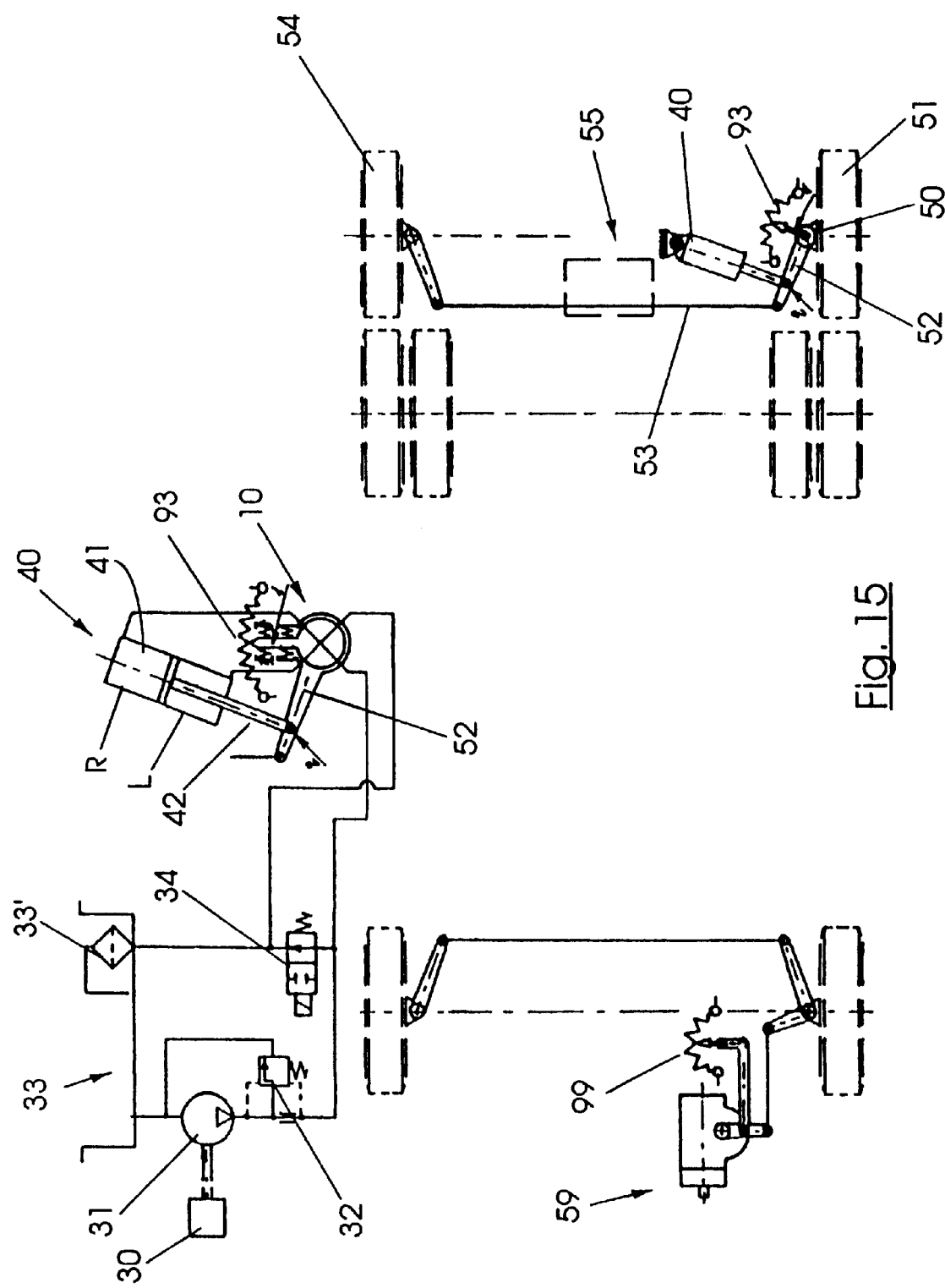
FIG. 15 illustrates a similar scheme to that given in FIG. 14, with the steering control transmission effected in an electronic or an electromechanical way.
Figure 16:
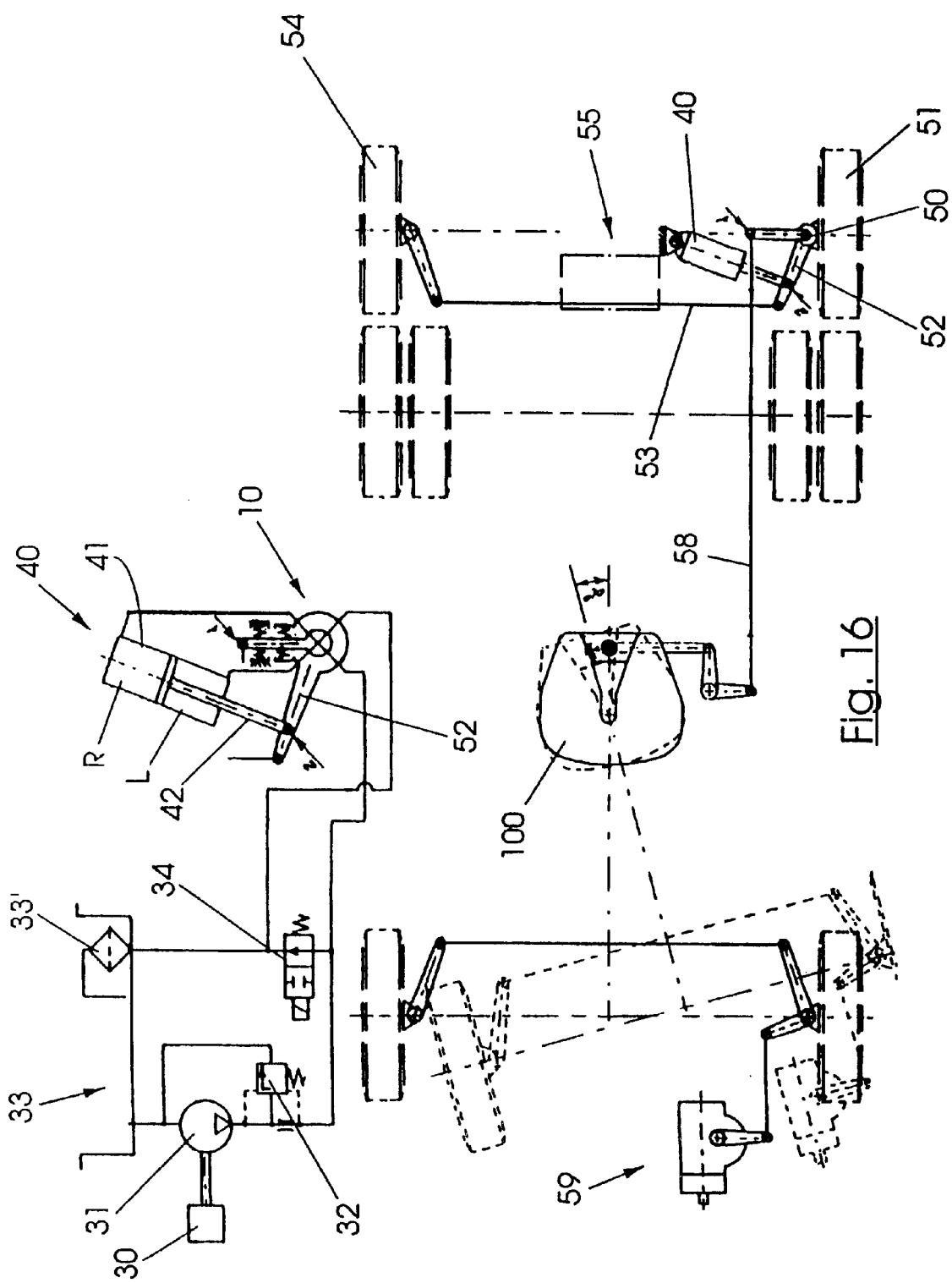
FIGS. 16 and 17 respectively illustrate two schemes similar to those given in FIGS. 14 and 15, where the device according to the present invention is applied for driving the rear steering axle controlled in both travelling directions on a semitrailer of an articulated vehicle.
Figure 17:
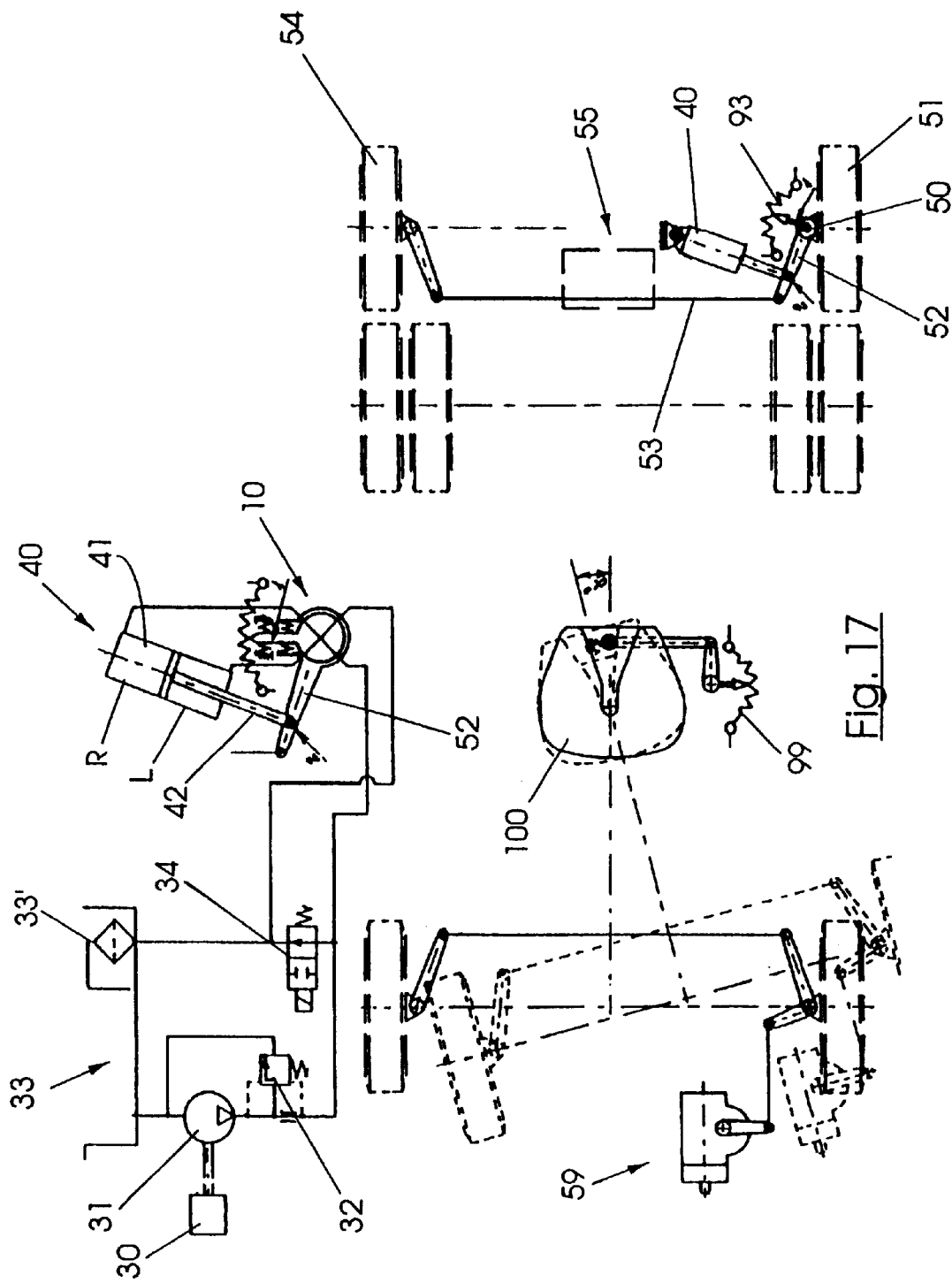

FIG. 10 illustrates an operational scheme of the form of embodiment whose basic scheme is illustrated in FIGS. 14 and 16, that corresponds with a third axle controlled in both the travelling direction, where device 10 is directly mechanically mounted onto axis 50 of the axle itself, and it is connected to hydraulic power steering system 59 or to fifth wheel 100 by dint of a Bowden control cable 58; the illustration in the lower part of FIGS. from 10 to 13 allows readers to compare the operating of rotating distribution system 10 according to the present invention with the operating of a conventional distribution unit of the axial type through a representation that is classically employed in oleodynamic.

On making the above comparison in distribution system 10 according to the present invention, there are found to be noticeable a schematic representation of wheel centering and alignment spring 83' and 94', and that of male centring spring 12 onto casing 11; the representation of the conventional type indicates the action positions of corresponding springs 23', 94' and 83'.

Respective reference numerals 1 and 2 indicate the points where the action and reverse action force vectors are applied, these forces acting on distribution system 10 according to the present invention and on its hypothetical homologue of a conventional type.

Figure 18:
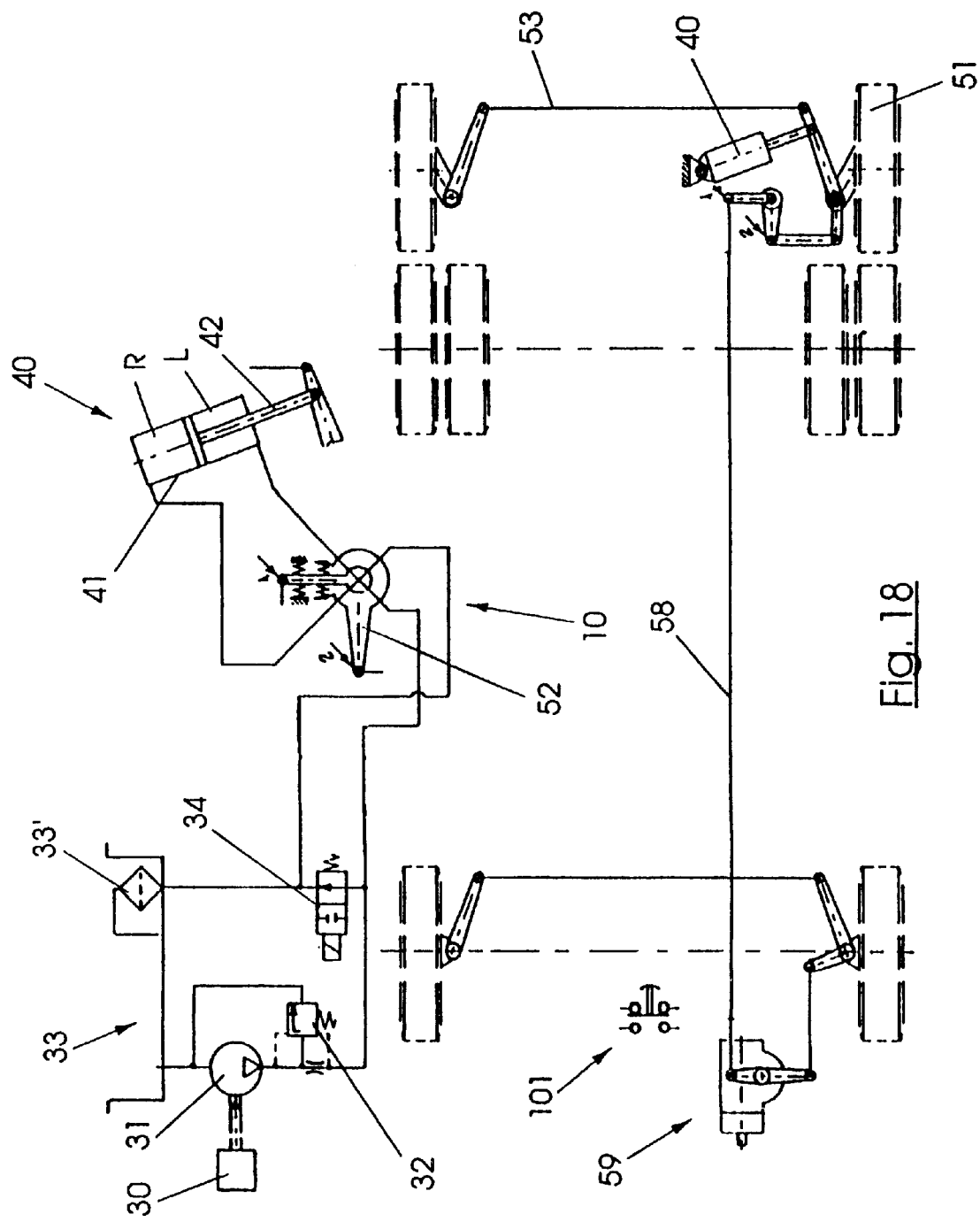
FIG. 18 shows a scheme illustrating the connection of a device according to the present invention in a general way when this is fixed misaligned from the rotation axis of the wheel of the driven axle, for an application of the self-steering third axle type controlled in reverse gear, with the transmission of the steering actuation accomplished by a Bowden cable
Figure 20:
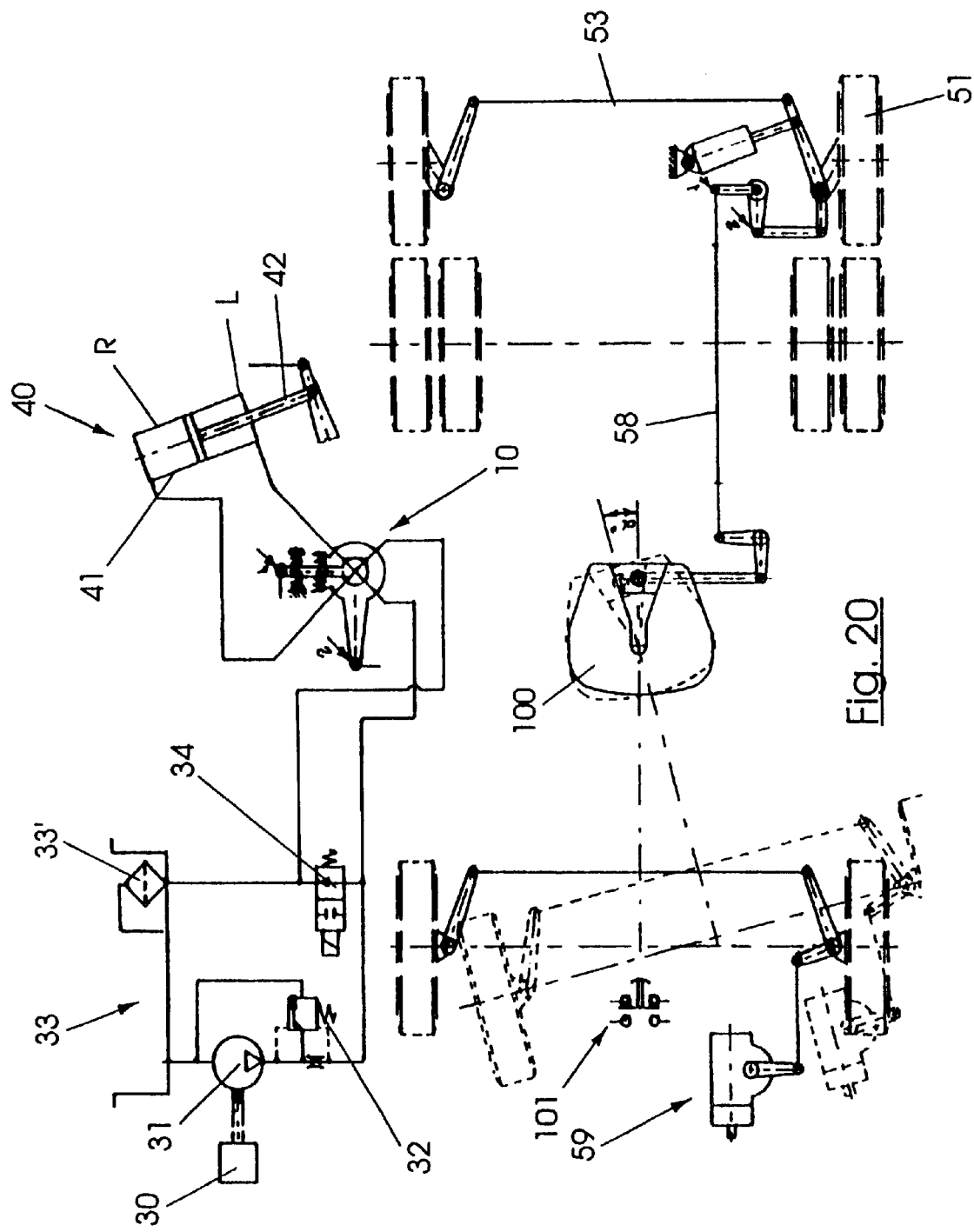
FIGS. 20 and 21 respectively illustrate two schemes that are similar to those of FIGS. 18 and 19, where the device according to the present invention is applied for the control of a rear selfsteering axle driven in reverse gear of a semitrailer of an articulated vehicle.

FIG. 11 illustrates a functional scheme of the form of embodiment wherein the working scheme is shown in FIGS. 18 and 20, and that corresponds with a third axle controlled in reverse gear, wherein device 10 is mounted misaligned from the rotation axis of the wheel of the driven axle, and it is further connected to hydraulic power steering system 59 or to fifth wheel 100 by a Bowden control cable 58.

Reference numeral 101 herein indicates an electromechanical device for the insertion of reverse gear.

Figure 19:
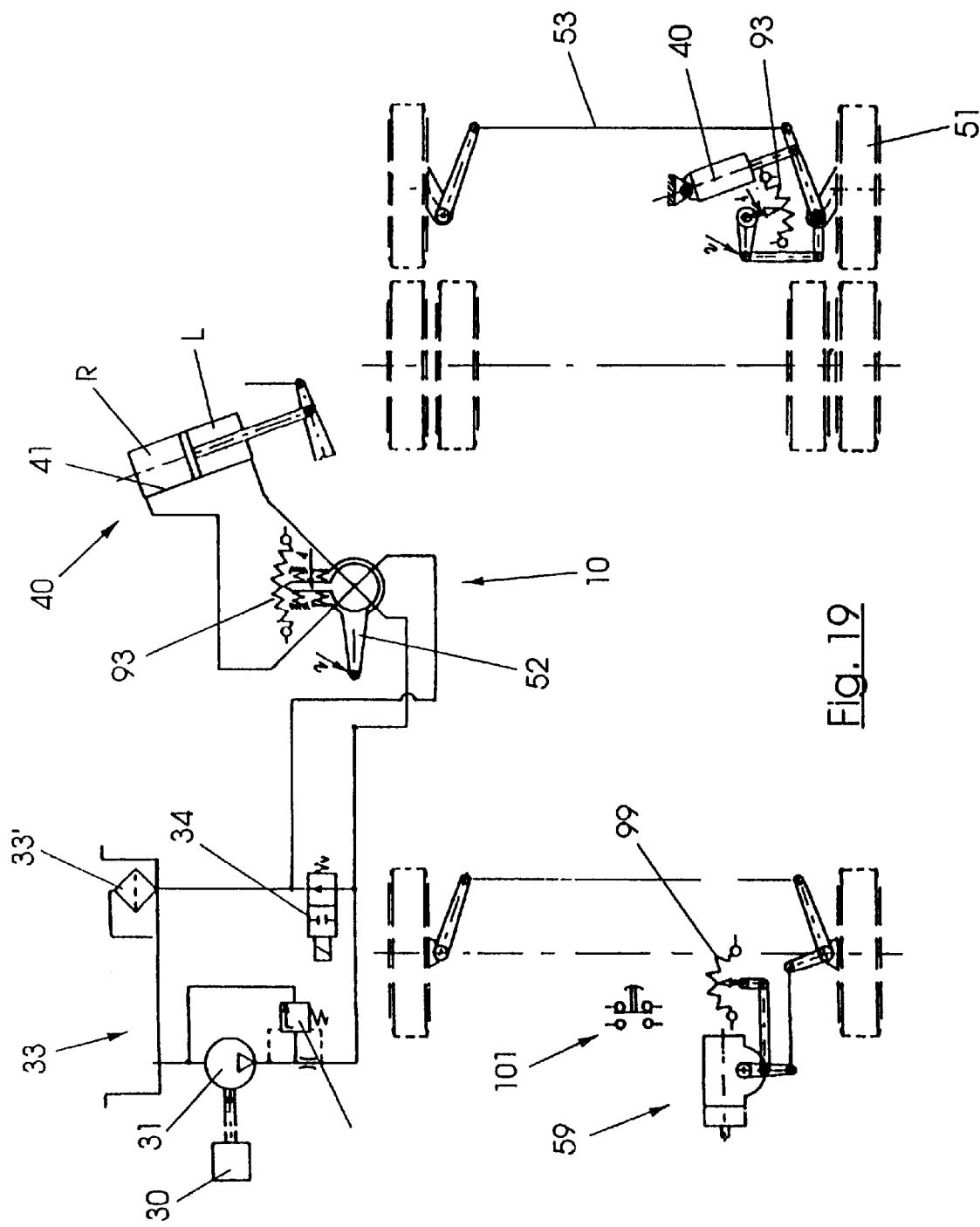
FIG. 19 illustrates a scheme that is similar to that given in FIG. 18, with the steering control transmitted electronically or electro mechanically.
Figure 21:
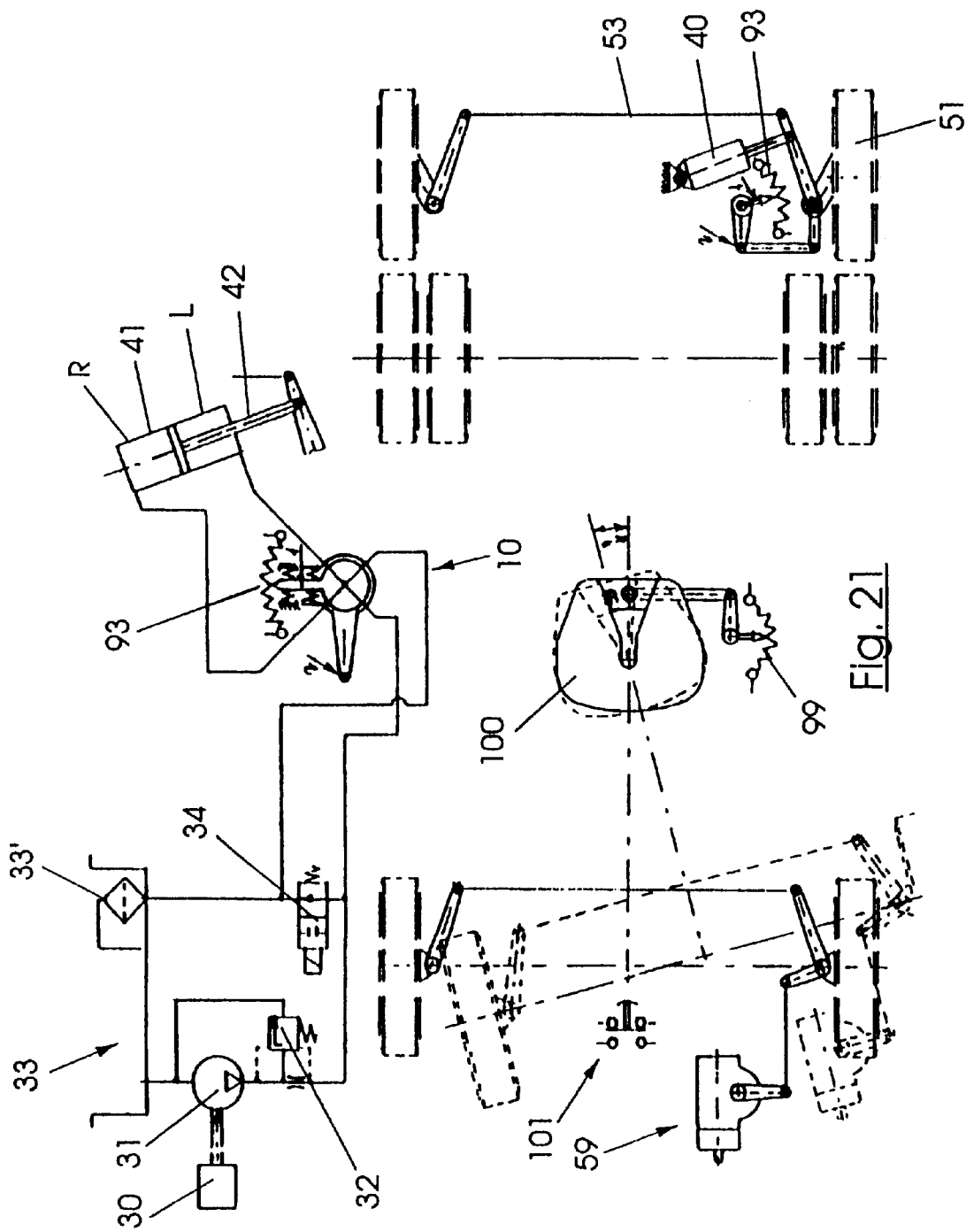

FIG. 12 illustrates a functional scheme of the form of embodiment where the working scheme is given in FIGS. 19 and 21, which is analogous to that illustrated in FIG. 11, therefore relative to an application with an electronic control system where angular position sensor 93 is highlighted.

On the working schemes illustrated in FIGS. 15, 17, 19 and 21 there is found to be noticeable sensor 99 of the position of the axle of the steering front wheels or of fifth wheel 100.

The invention was previously described with reference to some of its preferred forms of embodiment of the rotating distribution system of an oleodynamic type.

In particular, specific applications were described where the distribution system is employed for the rotation around a substantially vertical axis of a wheel that belongs to a driven axle of a vehicle, no matter whether it be a third axle or that of a semitrailer or trailer, the control being viable both mechanically or electronically.

However it appears to be very clear that the distribution system according to the present invention has a wider applicability that will appear to be clear to the skilled in the art and that is within the scope of the present invention as it was defined in the appended claims.

By way of example, the distribution system according to the present invention can also be located on the chassis of the vehicle, particularly in its front region, near the hydraulic power steering system or, in case of a semitrailer, near the fifth wheel.

Furthermore, generally speaking, the driving action can be equally effected on both the driving shaft and the core of the distribution system; in the latter case the core acts as a reverse action member.

In FIG. 22 there is found to be illustrated an operational scheme of a distribution unit device according to a further form of embodiment of the present invention.

In this case a control lever 102 activates the hydraulic distribution by a cynematic mechanism that reduces angular clearance and it further reduces both the hydraulic and mechanical angular rotations and mechanically drags driven lever 101 in case efficacy of the hydraulic auxiliary device of the system is missing or maimed.

In such a case casing 11 is mounted onto lever 102 and its axis is misaligned from rotation axis of the lever itself; core 12 is on the other hand connected to lever 101 by a cynematic mechanism that reduces the hydraulic angular clearance in so doing determining the desired promptness with which the hydraulic intervention takes place.

It can be observed that lever 102 and lever 101 pivot around the same axis and they mechanically contact each other, in order to allow one to drag the other, after a mechanical angular movement that is wider than the hydraulic angular movement.

In so far as some of the terms used above are concerned, attention is drawn to the fact that by "hydraulic angular clearance" it is meant to define the completer angular displacement of the male member with respect to the female member. In the above case, the intervention angle is normally in the range between 3+ and 8°.

FIG. 22 further illustrates a comparison with a functional scheme of an axial distribution system known in the art.

Figure 23A:
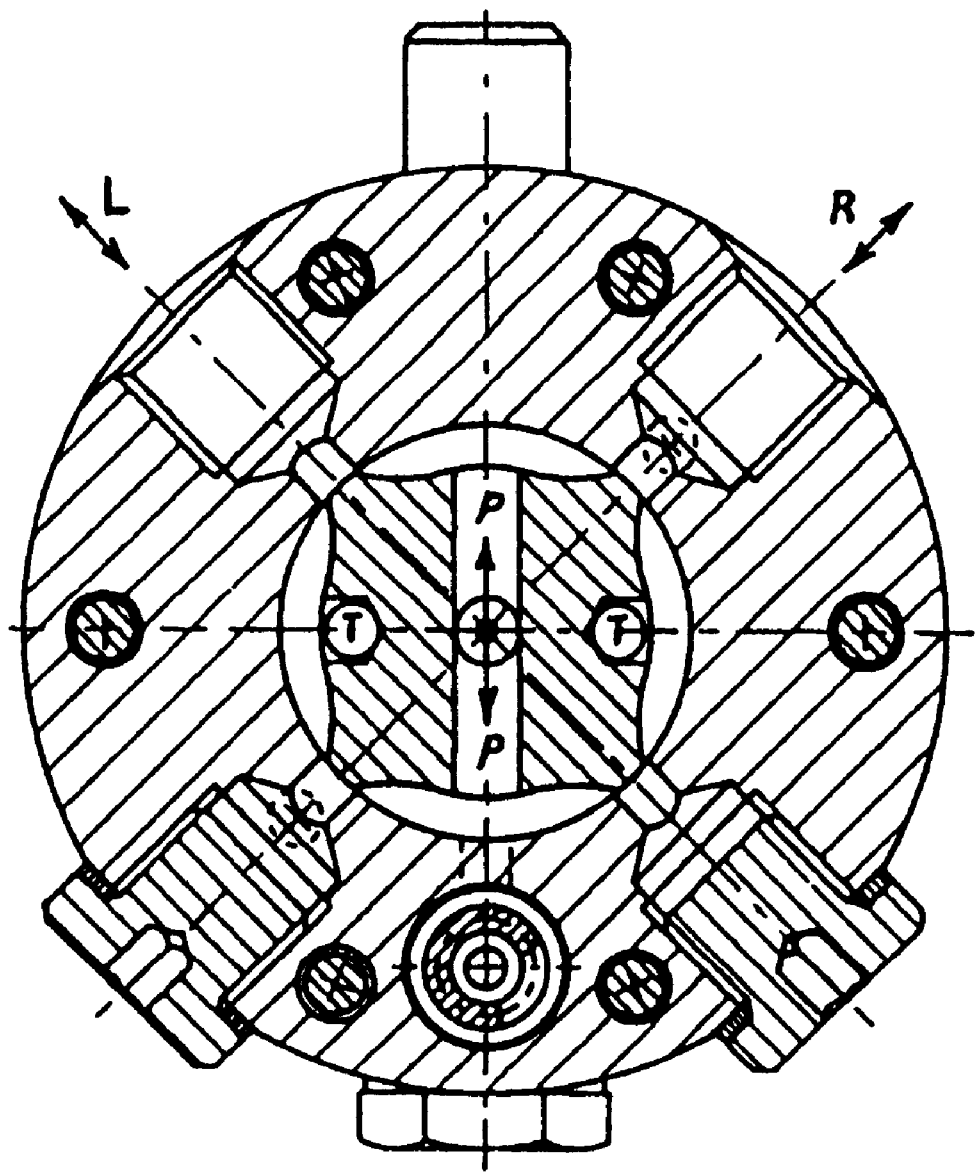
FIG. 23a illustrates a section along line A—A of FIG. 1, precisely a version thereof that allows an increase in the angular rotation up to about 88°.

Furthermore, FIG. 23a illustrates a section along line A—A of FIG. 1, a version thereof where the angular rotation of the hydraulic control of the rotating element with respect to the fixed member can be taken up to 89°, both clockwise and anticlockwise, with respect to an equilibrium starting position, that corresponds with a situation wherein the driving wheels are controlled in an alignment position in the same direction (vehicle moving along a straight ahead travelling direction).

FIG. 23b finally illustrates a section along line A—A of FIG. 1, a version thereof that allows the employment of a circuit with an oleodynamic system as its accumulator. The functional scheme is compared with that of a distribution system of an axial type known in the art. In the scheme there are found to be highlighted (reference is made to the arrows with reference numerals 150 and 151) the respective covering and opening areas of one of the orifices provided in casing 11.

Finally, the rotating distribution system according to the present invention can be even advantageously employed on machines and vehicles used in agriculture and industry.

What is claimed is:

1. Distribution system (10) of the oleodynamic type comprising a core (12), connected to a driving shaft (17), said core (12) encased inside a casing (11) provided with an inlet connection (60) for feeding a fluid coming from a suitable source (31) of pressurized fluid, an outlet connection (61) connected to a return circuit (61) of the fluid towards a tank (33), and at least tow connections (62, 63) for the selective direction of said fluid towards a respective chamber (R, L) of a double effect actuating cylinder (40), said core (12) and casing (11) being relatively movable with respect to one another, said core (12) being provided with suitable distribution guide members (13–16) in order to allow the selective passage of the pressurized fluid through to one or the other of said respective chambers of the actuating cylinder (40), following a movement drive exerted onto said core (12) relatively to said casing (11), or exerted onto casing (11) with respect to said core (12), said core (12) and said driving shaft (17) are aligned with said casing (11) and rotably movable about their common axis (X), system characterized in that said core (12) and said casing (11) constitute alone one oleodynamic system to which said driving shaft (17) is connected, and in that said distribution system (10) further comprises resilient centering means (22, 23), acting on the mechanical components external to said oleodynamic system connected to said core (12) or to said casing (11), said resilient centering means being suitable for exerting a force of rotation transmitted to said mechanical components external to the oleodynamic system so that, following a rotation actuation by a predetermined angle around the common axis (X), said mechanical components external to the oleodynamic system and said core (12), or said casing (11), in case the control is lacking, are taken back to their hydraulic centered position with the fluid flux in a by-pass situation.

2. Distribution system (10) according to claim 1, characterized in that said core (12) is aligned with said driving shaft (17) which is connected with the interposition of transmission members to a driving member (59, 100) with width of the angular rotation of said core (12) around said axis (X).

3. Distribution system (10) according to claim 2, characterized in that said core (12) is connected to said driving shaft (17) by means of an Oldham joint.

4. Distribution system (10) according to claim 1, characterized in that said casing (11) is provided with a second couple of connecting members (64, 65) for the selective direction of the pressurized fluid to the chambers of a second double effect actuating cylinder.

5. Distribution section (10) according to claim 1, characterized in that said core (12) is provided with a series of hydraulic distribution guides (13, 14, 15, 16) which are capable of widening or narrowing, the latter to the point of closure, the orifices provided in said casing (11) for the passage of pressurized fluid through to the chambers of the double effect actuating cylinder (40).

6. Distribution system (10) according to claim 1, characterized in that the resultant of the hydraulic pressures acting inside said system following a rotation manoeuvre in any working condition of said core (12) around the common axis (X) substantially equals nought.

7. Distribution system (10) according to claim 2, characterized in that said driving shaft (17) is shaped so as to include at least two sunken surfaces onto which said centering resilient means (22, 23) act.

8. Distribution system (10) according to claim 7, characterized in that said centering resilient means comprise a sphere (22) that is pressed onto said couple of sunken surfaces by a compression spring (23), one end of which leans against a member (24) that is rigidly coupled to said casing (11).

9. Distribution system (10) according to claim 1, characterized in that it comprises a control lever (73) rigidly coupled to said driving shaft (17) in order to carry out the rotation of said first section (12), said control lever (73) being provided with a safety member (74) including a couple limiting member, and provided with resiliently yielding members (77, 78), that are capable of avoiding the breakage of said control lever (74) in case it were not possible to carry out the rotation around the common axis (X).

10. Distribution system (10) according to claim 2, characterized in that it comprises a safety system (80) acting in a resilient fashion between the driving shaft (17) and a fixed bearing point of the driven axle, outside the distribution system, such that it automatically takes the driving shaft (17) back to its original position in case of a sudden interruption of the force that acts onto driving shaft (17).

11. Distribution system (10) according to claim 10, characterized in that said safety system (80) comprises a torsion or compression helicoidal spring (83), or a carriage spring (94) respectively located between said first fixed point and a member that is rigidly coupled to the driving shaft (17).

12. Distribution system (10) according to claim 1, characterized in that inside it comprises a member (25) simultaneously forming a pressure limiting valve and an anticavitation valve, said member (25) being provided with a movable head (26) and being respectively connected to the pressure chamber inside which said core (12) is located, through a plurality of orifice (29), and with the exhaust chamber (28) when said head (26) opens.

13. Distribution system (10) according to claim 1, characterized in that it is used for the steering of wheels that belong to at least one rear axle of an articulated semitrailer or trailer, said double effect actuating cylinder (40) being connected to the substantially vertical axle of a wheel (51) of said at least one axle to accomplish the rotation about said axis (50) following a steering manoeuvre in a forward or rearward straight ahead traveling position carried out starting from a front steering axle or from a fifth wheel (100) of said vehicle, transmission means being provided (58, 99) which are connected to the driving shaft (17) of said device (10) in order to transmit the steering control by a predetermined angle of wheels of the front axle to said at least one rear axle in order to obtain the rotation of the wheels thereof by an angle that is proportional to said predetermined angle.

14. Distribution system (10) according claim 13, characterized in that said casing (11) is directly mount onto an axle (50) of the wheel (51) of a driven axle.

15. Distribution system (10) according to claim 13, characterized in that the casing (11) is rigidly coupled to the axle (50) of the wheel (51) of the driven axle with the interposition of a connection member (85).

16. Distribution system (10) according to claim 13, characterized in that the casing (11) is mounted onto a chassis of the vehicle, particularly near a hydraulic power steering system or near the fifth wheel (100).

17. Distribution system (10) according to claim 13, characterized in that the driving shaft (17) of the core (12) is connected to wheels of the front axle or to the fifth wheel of the vehicle by dint of said driving lever (73) and by a connection member (58).

18. Distribution system (10) according to claim 14, characterized in that said safety system (80) comprises a spring (83) fixed between said control lever (73) and fixed wheels in a straight ahead centered traveling position of the driven axle, and in that the spring (83) constantly tends to take the lever (73) back to the centered position, where the wheels of the driven axle of the vehicle are aligned and centered along a straight line direction.

19. Distribution system (10) according to claim 14, characterized in that the driving shaft (17) of the core (12) is connected to an electric motor (91) that controls its rotation around a common axis (X), said drive shaft (17) being connected to a sensor (93) that detects its angular position, said sensor (93) being connected to an electronic circuit that controls the rotation of said electric motor (91) following a steering actuation oft he front wheels or of the fifth wheel of the vehicle, said electronic circuit receiving from a sensor (99) for the detection and measurement of the angular position of the front wheels or of the fifth wheel an electric signal that is representative of the angular position of the front wheels or of the fifth wheel and being provided with comparison means between the respective angular positions of the front wheels or of the fifth wheel and of the wheels of the driven axle.

20. Distribution system (10) according to claim 19, where the electric motor (91) acts onto the driving shaft (17) with the interposition of a reduction unit (90) characterized in that said safety system (80) comprise a carriage spring (94) acting between the movable part of said reduction unit (90) and a fixed point rigidly coupled to the axle of the vehicle.

21. Distribution system (10) according to claim 14, characterized in that it allows a hydraulic control angular rotation of 58° or 88° both clockwise and anticlockwise with respect to a conventional equilibrium and starting position corresponding to a situation wherein the wheels of the steering axle and of the driven axle of the vehicle are in a straight ahead traveling position, in so doing allowing to accomplish a control of the rotation of the wheels themselves over the whole angular width of their rotation, even when the wheels of the steering axle are located at the end of their motion along a direction that is opposite to those, at the end of their motion, too, of the driven axle.

22. Distribution system (10) according to claim 1, characterized in that said core (12) is provided with a series of hydraulic distribution guides (13, 14, 15, 16) located depending on the oleodynamic scheme to accomplish, at the edge (X, FIG. 23b) or covering (Y, FIG. 23b) orifices provided inside said casing (11) for the passage of pressurized fluid through to the chambers of the double effect actuating cylinder (40).

23. Distribution system (10) according to claim 1, characterized in that said casing (11) is mounted onto a pivoting level (102) and is misaligned from the pivoting axis of said lever (102), and in that the core (12) is connected to another lever (101) by a kinematic mechanism that reduces the hydraulic angular clearance causing the desired intervention promptness, and in that said pivoting lever (102) and said other lever (101) pivot about the same axis and are suitable for mechanically contacting each other in order to allow the dragging of one by the other.

24. Distribution system (10) according to claim 2, characterized in that said driving shaft (17) is the said mechanical component, external to the oleodynamic system, on which said resilient centering means (22, 23) act.

25. Distribution system (10) according to claim 2, characterized in that said resilient centering means (22, 23) is connected to said casing (11).

\* \* \* \* \*